United States Patent

Yamazaki et al.

Patent Number: 6,120,113
Date of Patent: Sep. 19, 2000

[54] HYDRAULIC BRAKING SYSTEM FOR AN AUTOMOTIVE VEHICLE

[75] Inventors: Norio Yamazaki; Yoshiyuki Yasui, both of Kariya; Kenji Tozu, Yokkaichi; Masanobu Fukami, Aichi-pref; Takayuki Itoh, Nagoya; Seiichi Kojima, Handa, all of Japan

[73] Assignee: Aisin Seiki Kabushiki Kaisha, Kariya, Japan

[21] Appl. No.: 08/840,587

[22] Filed: Apr. 22, 1997

[30] Foreign Application Priority Data

Apr. 26, 1996 [JP] Japan .................................. 8-130662
Jul. 12, 1996 [JP] Japan .................................. 8-183516

[51] Int. Cl.$^7$ ...................................................... B60T 8/40
[52] U.S. Cl. ...................................................... 303/116.2
[58] Field of Search .............................. 303/116.2, 113.2

[56] References Cited

U.S. PATENT DOCUMENTS

| 4,878,715 | 11/1989 | Toda . |
| 4,898,431 | 2/1990 | Karnopp et al. . |
| 5,236,256 | 8/1993 | Schmidt et al. ...................... 303/113.2 |
| 5,560,690 | 10/1996 | Hattori et al. ........................ 303/116.2 |
| 5,711,585 | 1/1998 | Tozu et al. .............................. 303/140 |

FOREIGN PATENT DOCUMENTS

| 0 714 821 | 6/1996 | European Pat. Off. . |
| 38 31 426 | 4/1989 | Germany . |
| 43 33 568 | 4/1995 | Germany . |
| 51-40816 | 11/1976 | Japan . |
| 5-185918 | 7/1993 | Japan . |
| 7-149218 | 6/1995 | Japan . |

*Primary Examiner*—Robert J. Oberleitner
*Assistant Examiner*—Robert A. Siconolfi
*Attorney, Agent, or Firm*—Burns, Doane, Swecker & Mathis, LLP

[57] ABSTRACT

The present invention is directed to a hydraulic braking system for an automotive vehicle, wherein a first passage is provided for communicating a master cylinder with first and second wheel cylinders. First and second pressure control devices are disposed in the first passage to control the hydraulic pressure of the brake fluid in the first and second wheel cylinders, respectively. A second passage is provided for communicating the master cylinder with an inlet of an auxiliary pressure source, which introduces the brake fluid from the wheel cylinders, and discharges the pressurized brake fluid to the wheel cylinders through the pressure control devices. A valve device is disposed in the first passage and connected to the second passage to selectively place one of a first operating position for communicating the master cylinder with the pressure control devices and blocking the communication between the master cylinder and the inlet of the auxiliary pressure source, and a second operating position for communicating the master cylinder with the inlet of the auxiliary pressure source and blocking the communication between the master cylinder and the pressure control devices. At least an auxiliary passage is provided for communicating the master cylinder with at least one of the wheel cylinders. And, at least a switching valve is disposed in the auxiliary passage to open and close the auxiliary passage.

16 Claims, 15 Drawing Sheets

HYDRAULIC BRAKING SYSTEM FOR AN AUTOMOTIVE VEHICLE

BACKGROUND OF THE INVENTION

1. Field of the Invention

The present invention relates to a hydraulic braking system for use in an automotive vehicle, performing various control modes such as an anti-skid control, a traction control and a steering control for restraining an excessive oversteer and excessive understeer which will occur during, for example, cornering, by applying a braking force to each wheel of the vehicle irrespective of depression of a brake pedal.

2. Description of the Related Arts

In a recent vehicle, a hydraulic braking system is designed for performing not only a normal braking but also an anti-skid control and a traction control. For example, Japanese Patent Laid-open Publication No. 5-185918 discloses a hydraulic braking apparatus to perform the skid control and traction control. Referring to figures in the Publication, the apparatus includes a first wheel cylinder (18) which is mounted on a driven wheel to apply a braking force thereto, a second wheel cylinder (20) which is mounted on a non-driven wheel to apply the braking force, and a master cylinder (15) for generating a pressurized brake fluid. The master cylinder (15) is connected to the first wheel cylinder (18) through a brake passage (17), in which a normally open inlet valve (34) is disposed. The first wheel cylinder (18) is connected to an accumulator (43) through a normally closed outlet valve (40). A fluid pump (41) has an inlet which is connected to the accumulator (43), and an outlet which is connected to the brake passage (17) between the master cylinder (15) and the inlet valve (34). The fluid pump (41) is provided for pressurizing the brake fluid in the accumulator (43), and discharging it into the first wheel cylinder (18).

In the brake passage (17) between the outlet of the pump (41) connected thereto and the master cylinder (15), is disposed an orifice (30), through which the pressurized brake fluid is gradually supplied to the first wheel cylinder (18) during the anti-skid control operation. In the brake passage (17) between the orifice (30) and the master cylinder (15), is disposed a normally open first cut-off valve (27) which is closed during the traction control operation. The brake passage (17) between the valve (27) and the master cylinder (15) is connected to the inlet of the pump (41) through an induction passage (44), in which a normally open second cut-off valve (50) is disposed to be closed during the anti-skid control operation, and to be opened during the traction control operation. Therefore, the brake fluid in the master cylinder (15) is introduced into the pump (41) through the induction passage (44) to be pressurized and discharged into the first wheel cylinder (18) through the brake passage (17) without the orifice. The induction passage (44) between the valve (50) and the inlet of the pump (41) is connected to the first wheel cylinder (18) through an additional depression brake passage (51), whereby the additional depression of the bake pedal can be made by a vehicle driver during the traction control operation.

According to the above-described apparatus, the valve (50) is generally opened during the traction control operation, but it has to be closed when the brake fluid stored in the accumulator (43) is drained by the pump (41). In the latter case, however, the brake fluid in the wheel cylinders (18) can not be pressurized, even if the brake pedal is depressed.

Furthermore, according to the above-described apparatus, the second wheel cylinder (20) is not connected to the outlet of the pump (41), because the traction control is not performed with respect to the non-driven wheel, on which the second wheel cylinder (20) is mounted.

In addition to the anti-skid control and traction control as describe above, the recent vehicle is provided with a control system for controlling the braking force applied to the wheel irrespective of depression of the brake pedal (i.e., even when the vehicle driver does not operate the brake pedal) to perform a front-rear braking force distribution control, a steering control by braking as described later in detail, and an auto-braking control. In the U.S. Pat. No. 4,898,431, for example, an apparatus for controlling vehicle motion through the use of a brake controlling system which compensates for the influence of lateral forces on the vehicle. The apparatus is adapted to control the braking force applied to the vehicle by the braking force control system in response to a comparison of a desired yaw rate with an actual yaw rate, thereby to improve the vehicle stability during the course of vehicle motion such as cornering.

In general, "oversteer" and "understeer" are used to indicate a vehicle steering characteristic. When the oversteer is excessive during vehicle motion such as cornering, the rear wheels of the vehicle have a tendency to slip excessively in the lateral direction to cause a decrease in turning radius of the vehicle. The oversteer occurs when a cornering force CFf of the front wheels largely exceeds a cornering force CFr of the rear wheels (i.e., CFf>>CFr). As shown in FIG. 17, when a vehicle VL is undergoing a cornering maneuver along a curve of a turning radius R, for example, a lateral acceleration Gy which is normal to the vehicle's path of motion is calculated in accordance with an equation of $Gy=V^2/R$, where "V" corresponds to a vehicle speed, and a total CFo of the cornering force is calculated in accordance with the following equation:

$$CFo = \Sigma CF = m \cdot Gy$$

where "m" corresponds to a mass of the vehicle VL. Accordingly, in the case where the sum of the cornering force CFf and the cornering force CFr is larger than the total cornering force CFo for the vehicle's cornering maneuver along the curve of the turning radius R (i.e., CFo<CFf+CFr), and the cornering force CFf of the front wheels largely exceeds the cornering force CFr of the rear wheels (i.e., CFf>>CFr), i.e., the oversteer is excessive, then the vehicle VL will be forced to turn in a direction toward the inside of the curve in the vehicle's path to cause a reduce in turning radius of the vehicle VL as shown in FIG. 17.

When the understeer is excessive during cornering, the lateral slip of the vehicle will be increased, the vehicle VL will be forced to turn in a direction toward the outside of the curve in the vehicle's path to cause an increase in turning radius of the vehicle VL as shown in FIG. 18. Thus, the excessive understeer occurs when the cornering force CFf of the front wheels is almost equal to the cornering force CFr of the rear wheels so as to be balanced with each other, or the latter is slightly larger than the former (i.e., CFf<CFr), and when the sum of the cornering force CFf and the cornering force CFr is smaller than the total cornering force CFo which is required for the vehicle's cornering maneuver along the curve of turning radius R (i.e., CFo>CFf+CFr), then the vehicle VL will be forced to turn in the direction toward the outside of the curve in the vehicle's path thereby to increase the turning radius R.

The excessive oversteer is determined on the basis of a vehicle side slip angle or vehicle slip angle β and a vehicle slip angular velocity Dβ, for example. When it is determined that the excessive oversteer occurs during cornering, a braking force will be applied to a front wheel located on the outside of the curve in the vehicle's path, for example, to produce a moment for forcing the vehicle to turn in the direction toward the outside of the curve, i.e., an outwardly oriented moment, in accordance with an oversteer restraining control, which may be called as a vehicle stability control. On the other hand, the excessive understeer is determined on the basis of a difference between a desired lateral acceleration and an actual lateral acceleration, or a difference between a desired yaw rate and an actual yaw rate, for example. When it is determined that the excessive understeer occurs while a rear-drive vehicle is undergoing a cornering maneuver, for example, the braking force will be applied to a front wheel located on the outside of the curve and applied to both of the rear wheels to produce a moment for forcing the vehicle to turn in the direction toward the inside of the curve, i.e., an inwardly oriented moment, in accordance with an understeer restraining control, which may be called as a course trace performance control. The above-described oversteer restraining control and understeer restraining control as a whole may be called as a steering control by braking. In accordance with a similar manner as described heretofore, an auto-braking control may be performed to apply the braking force to the vehicle wheels automatically when a frontal obstacle is detected.

In the vehicle motion control system as described above, the hydraulic pressure in the wheel cylinders is controlled by means of the auxiliary pressure source, with the hydraulic communication between the master cylinder and the wheel cylinders blocked. For example, when the steering control by braking is performed, the hydraulic pressure in the wheel cylinders is controlled irrespective of the condition of the brake pedal. During the steering control by braking is being performed, however, if the brake pedal is depressed, it is desirable to immediately shift a control mode to a normal braking mode with respect to at least a wheel which is not being controlled. In order to detect the depression of the brake pedal, it is proposed to use a pressure sensor for detecting the hydraulic pressure. However, the pressure sensor is relatively expensive comparing with the electro-magnetic valve, so that it is desirable to reduce the number of the pressure sensors as small as possible.

According to a hydraulic braking system having a master cylinder with a vacuum booster and an auxiliary pressure source (e.g., a fluid pump driven by an electric motor), for example, during the steering control by braking is being performed, if the rapid braking operation is made in response to depression of the brake pedal before the auxiliary pressure source is activated to provide sufficient pressure for a desired braking force distribution, it will be impossible to apply the desired braking force to the wheel to be controlled.

Furthermore, according to the apparatus as disclosed in the Japanese Publication No. 5-185918, the second wheel cylinder (20) mounted on the non-driven wheel is not connected to the outlet of the pump (41), so that the braking force can not be applied to the non-driven wheel without the brake pedal depressed, while it is necessary to apply the braking force irrespective of depression of the brake pedal for performing the steering control by braking and the auto-braking control as described above.

SUMMARY OF THE INVENTION

Accordingly, it is an object of the present invention to provide a hydraulic braking system for use in an automotive vehicle, wherein an appropriate braking force can be applied to each wheel in response to depression of a brake pedal, even if a traction control is being performed with respect to the wheel.

It is another object of the present invention to provide a hydraulic braking system for use in an automotive vehicle, wherein an appropriate braking force can be applied to each wheel in response to depression of a brake pedal, even in the case where a steering control by braking or an auto-braking control is being performed with respect to the wheel, so that the braking force is being applied to the wheel irrespective of depression of the brake pedal.

In accomplishing the above and other objects, a hydraulic braking system is provided for an automotive vehicle having a pair of hydraulic pressure circuits for braking each wheel of the vehicle, a reservoir for storing brake fluid, and a master cylinder for pressurizing the brake fluid fed from the reservoir and supplying hydraulic pressure to the hydraulic pressure circuits in response to depression of a brake pedal. In this hydraulic braking system, at least one of the hydraulic pressure circuits includes a first wheel cylinder which is operatively mounted on a first wheel of the vehicle for braking the first wheel, and a second wheel cylinder which is operatively mounted on a second wheel of the vehicle for braking the second wheel. A first passage is provided for communicating the master cylinder with the first and second wheel cylinders. First and second pressure control devices are disposed in the first passage to control the hydraulic pressure of the brake fluid in the first and second wheel cylinders, respectively. There is provided an auxiliary pressure source having an inlet for introducing the brake fluid from the first and second wheel cylinders through the first and second pressure control devices, respectively, and an outlet for discharging pressurized brake fluid to the first and second wheel cylinders through the first and second pressure control devices, respectively. A second passage is provided for communicating the master cylinder with the inlet of the auxiliary pressure source. A valve device is disposed in the first passage and connected to the second passage for selectively placing one of a first operating position for communicating the master cylinder with the first and second pressure control devices and blocking the communication between the master cylinder and the inlet of the auxiliary pressure source, and a second operating position for communicating the master cylinder with the inlet of the auxiliary pressure source and blocking the communication between the master cylinder and the first and second pressure control devices. At least an auxiliary passage is provided for communicating the master cylinder with at least one of the first and second wheel cylinders. And, at least a switching valve, e.g., a normally closed two-port two-position valve or a normally open two-port two-position valve, is disposed in the auxiliary passage to open and close the auxiliary passage.

In this hydraulic braking system, both of the hydraulic pressure circuits may include a first auxiliary passage for communicating the master cylinder with the first wheel cylinder, a first switching valve disposed in the first auxiliary passage for opening and closing the first auxiliary passage, a second auxiliary passage for communicating the master cylinder with the second wheel cylinder, and a second switching valve disposed in the second auxiliary passage for opening and closing the second auxiliary passage. Or, only one of the hydraulic pressure circuits may include the first auxiliary passage, the first switching valve, the second auxiliary passage and the second switching valve. Otherwise, both of the hydraulic pressure circuits may include an auxiliary passage for communicating the master cylinder with one of the first and second wheel cylinders, and a switching valve disposed in the auxiliary passage for opening and closing the auxiliary passage.

In the hydraulic braking system as described above, the auxiliary passage may be connected to a position between the master cylinder and the valve device. Or, the auxiliary passage may be connected to the second passage, so as to communicate the master cylinder with at least one of the first and second wheel cylinders through the valve device in its second operating position.

The auxiliary pressure source may comprise an electric motor and a fluid pump which is driven by the electric motor for introducing the brake fluid from the master cylinder into the fluid pump through its inlet and discharging the pressurized brake fluid from its outlet. An auxiliary reservoir for storing the brake fluid drained from the first and second pressure control devices may be connected to the first and second pressure control means and the inlet of the fluid pump, and the brake fluid stored in the auxiliary reservoir can be drained by the fluid pump into the master cylinder.

Preferably, the valve device comprises a three-port two-position changeover valve which is disposed in the first passage and connected to the second passage for selectively placing one of a first position for communicating the master cylinder with the first and second pressure control devices and blocking the communication between the master cylinder and the second passage, and a second position for communicating the master cylinder with the second passage and blocking the communication between the master cylinder and the first and second pressure control devices. The valve device may comprise a normally open two-port two-position valve which is disposed in the first passage, with its one port connected to the master cylinder and the other port connected to the first and second pressure control devices, and a normally closed two-port two-position valve with its one port connected to the master cylinder and the other port connected to the second passage.

The hydraulic braking system may further comprise a check valve which is disposed in the auxiliary passage between the switching valve and one of the first and second wheel cylinders, for allowing the flow of the brake fluid from the switching valve to one of the first and second wheel cylinders, and preventing the reverse flow.

BRIEF DESCRIPTION OF THE DRAWINGS

The above stated object and following description will become readily apparent with reference to the accompanying drawings, wherein like reference numerals denote like elements, and in which.

DESCRIPTION OF THE PREFERRED EMBODIMENTS

Figure 16:
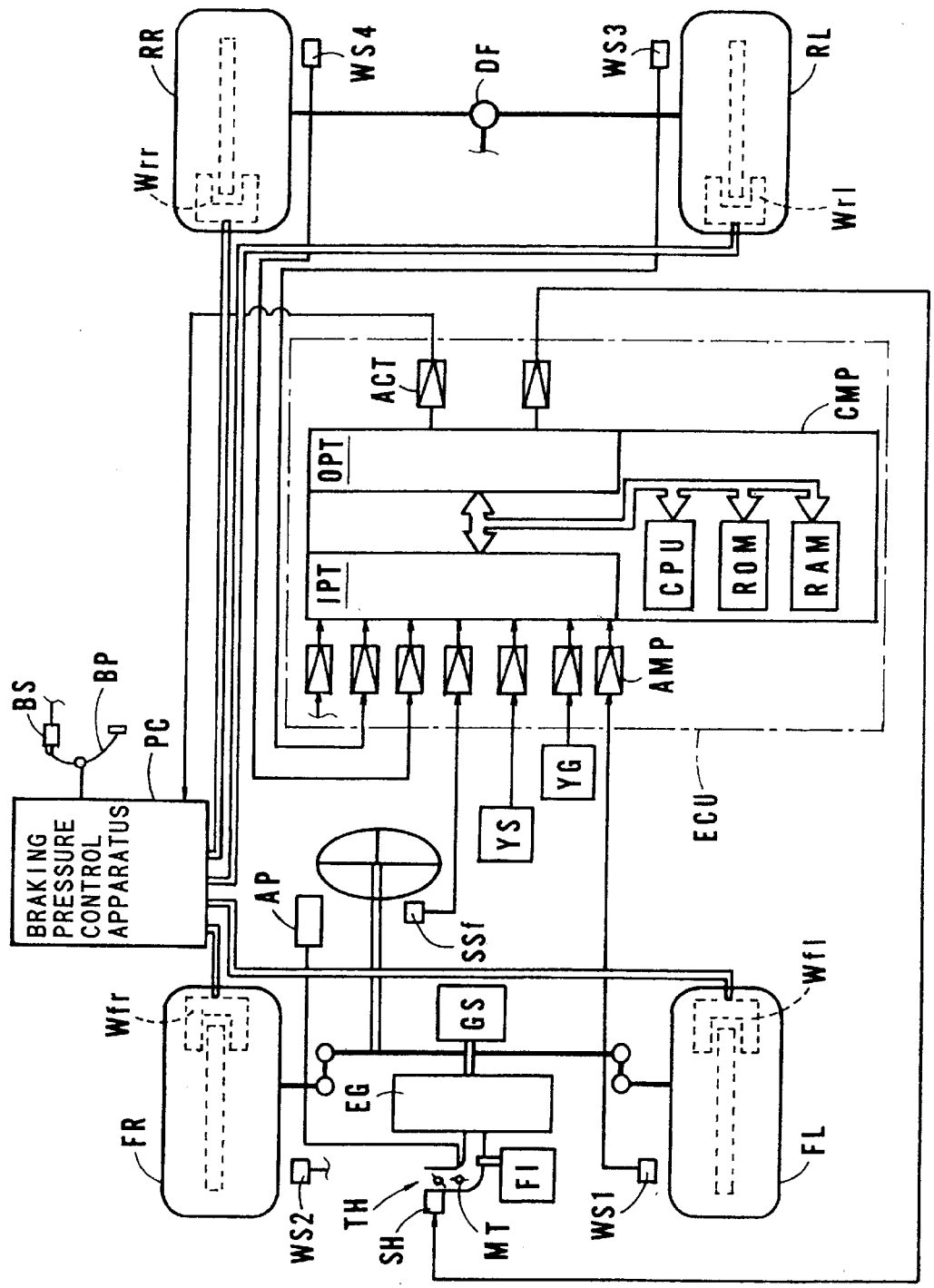
FIG. 16 is a schematic block diagram of a vehicle motion control system using a hydraulic braking system according to one of the above embodiments of the present invention.
Figure 17:
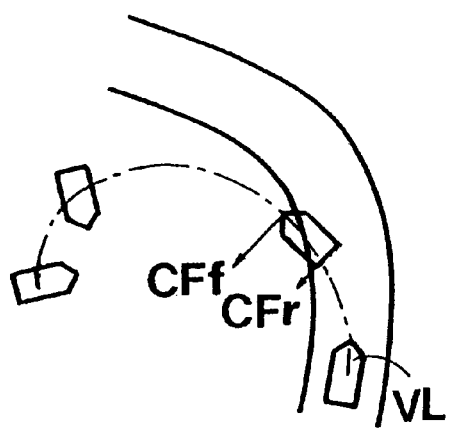
FIG. 17 is a drawing illustrating a state where an excessive oversteer occurs while a conventional vehicle is turning to the left.
Figure 18:
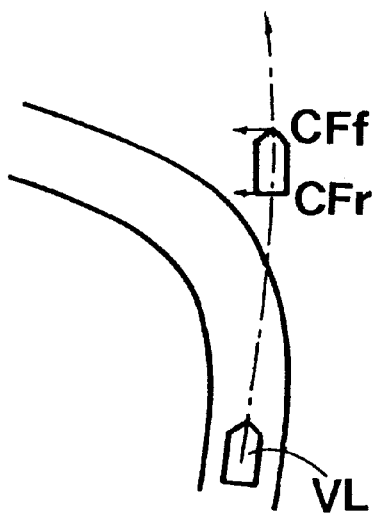
FIG. 18 is a drawing illustrating a state where an excessive understeer occurs while the conventional vehicle is turning to the left.

Referring to FIG. 16, there is schematically illustrated a vehicle motion control system including a hydraulic braking system according to the present invention. The vehicle motion control system is adapted to control a braking force applied to front non-driven wheels FL, FR and rear driven wheels RL, RR of a vehicle individually. The vehicle has an engine EG provided with a fuel injection apparatus FI and a throttle control apparatus TH which is arranged to control a main throttle opening of a main throttle valve MT in response to operation of an accelerator valve AP. The throttle control apparatus TH has a sub-throttle valve SH which is actuated in response to an output signal of an electronic controller ECU to control a sub-throttle opening. Also, the fuel injection apparatus FI is actuated in response to an output signal of the electronic controller ECU to control the fuel injected into the engine EG. According to the present embodiment, the engine EG is operatively connected to the rear wheels RL, RR through a transmission GS and a differential gear DF to provide a rear-drive system, but the present embodiment is not limited to the rear drive system.

With respect to the hydraulic braking system according to the present embodiment, wheel brake cylinders Wfl, Wfr, Wrl, Wrr are operatively mounted on the front wheels FL, FR and rear wheels RL, RR of the vehicle, respectively, and fluidly connected to a hydraulic braking pressure control apparatus PC. The wheel FL designates the wheel at the front left side as viewed from the position of a driver's seat, the wheel FR designates the wheel at the front right side, the wheel RL designates the wheel at the rear left side, and the wheel RR designates the wheel at the rear right side. According to the present embodiment, a front-rear dual circuit system is employed, while a diagonal circuit system may be employed, as explained later with reference to FIGS. 14, 15.

As shown in FIG. 16, at the wheels FL, FR, RL and RR, there are provided wheel speed sensors WS1 to WS4 respectively, which are connected to an electronic controller ECU, and by which a signal having pulses proportional to a rotational speed of each wheel, i.e., a wheel speed signal is fed to the electronic controller ECU. There are also provided a brake switch BS which turns on when the brake pedal BP is depressed, and turns off when the brake pedal BP is released, a front steering angle sensor SSf for detecting a steering angle δ f of the front wheels FL, FR, a lateral acceleration sensor YG for detecting a vehicle lateral acceleration, and a yaw rate sensor YS for detecting a yaw rate of the vehicle. These are electrically connected to the electronic controller ECU. According to the yaw rate sensor YS, a varying rate of rotational angle of the vehicle about a normal on the center of gravity of the vehicle, i.e., a yaw angular velocity or yaw rate γ is detected and fed to the electronic controller ECU. The yaw rate γ may be calculated on the basis of a wheel speed difference Vfd between the wheel speeds of non-driven wheels (wheel speeds Vwfl, Vwfr of the front wheels FL, FR in the present embodiment), i.e., Vfd=Vwfr−Vwfl, so that the yaw rate sensor YS may be omitted. Furthermore, between the wheels RL and RR may be provided a steering angle control apparatus (not shown), which enables a motor (not shown) to control a steering angle of the wheels RL, RR in response to the output of the electronic controller ECU.

As shown in FIG. 16, the electronic controller ECU is provided with a microcomputer CMP which includes a central processing unit or CPU, a read-only memory or ROM, a random access memory or RAM, an input port IPT, and an output port OPT, and etc. The signals detected by each of the wheel speed sensors WS1 to WS4, brake switch BS, front steering angle sensor SSf, yaw rate sensor YS and lateral acceleration sensor YG are fed to the input port IPT via respective amplification circuits AMP and then to the central processing unit CPU. Then, control signals are fed from the output port OPT to the throttle control apparatus TH and hydraulic pressure control apparatus PC via the respective driving circuits ACT. In the microcomputer CMP, the read-only memory ROM memorizes a program corresponding to flowcharts shown in FIGS. 5 to 8, the central processing unit CPU executes the program while the ignition switch (not shown) is closed, and the random access memory RAM temporarily memorizes variable data needed to execute the program. A plurality of microcomputers may be provided for each control such as throttle control, or may be provided for performing various controls, and electrically connected to each other.

Figure 1:
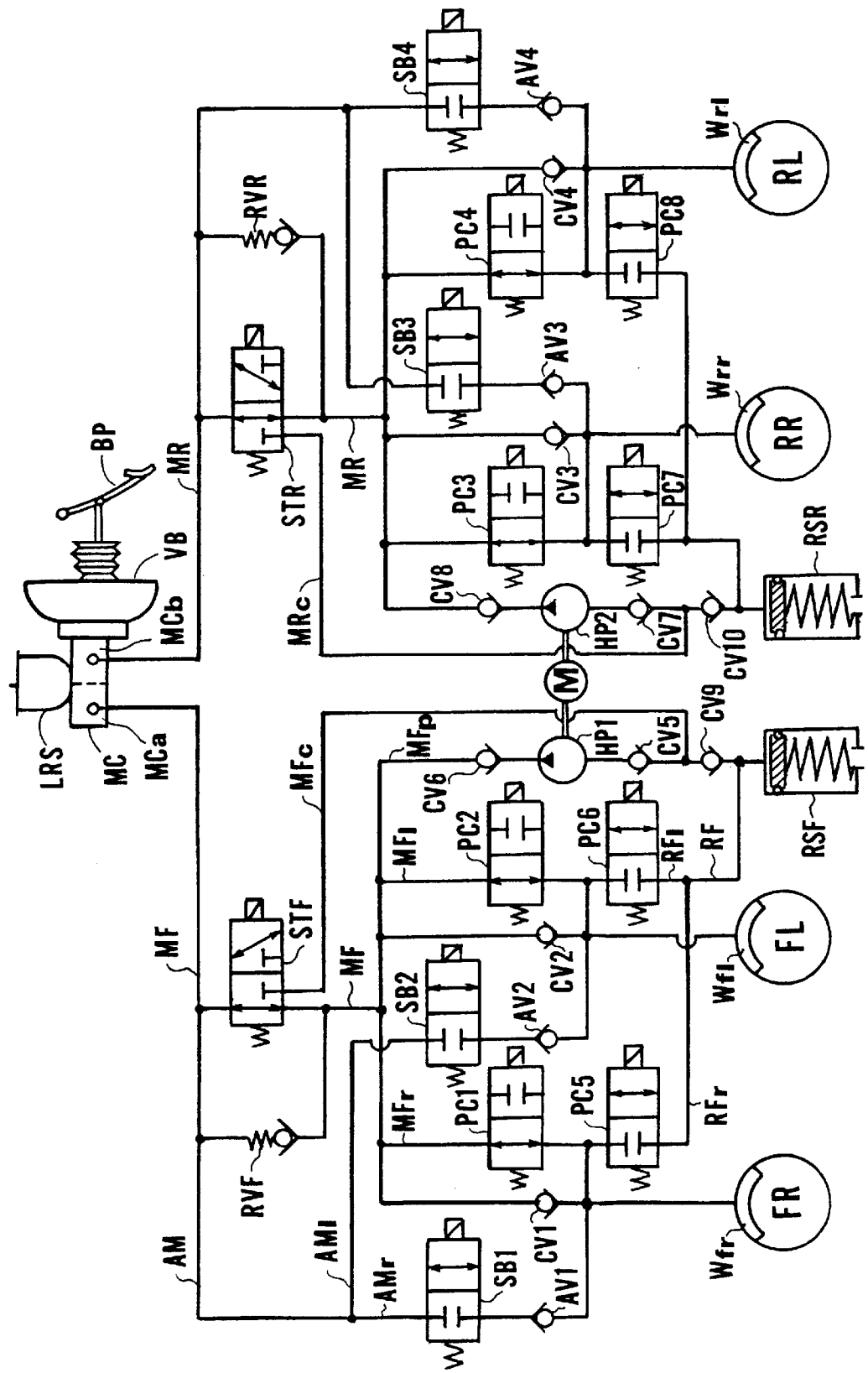
FIG. 1 is a block diagram illustrating a hydraulic braking system according to a first embodiment of the present invention.

FIG. 1 shows a first embodiment of the present invention including the hydraulic braking pressure control apparatus PC as shown in FIG. 16. The apparatus PC includes a master cylinder MC and a vacuum booster VB which are activated in response to depression of the brake pedal BP. The master cylinder MC is a tandem master cylinder having two pressure chambers which are connected to the front and rear hydraulic pressure circuits, respectively. That is, the first pressure chamber MCa is connected to the front hydraulic pressure circuit, while the second pressure chamber MCb is connected to the second hydraulic pressure circuit. In the front hydraulic pressure circuit for the wheel cylinders Wfr, Wfl, the first pressure chamber MCa is communicated with the wheel cylinders Wfr, Wfl through a main passage MF and its branch passages MFr, MFl which constitute the first passage according to the present invention. In the main passage MF, is disposed a three-port two-position electromagnetic changeover valve STF (hereinafter, simply referred to as changeover valve STF) which constitute the first valve according to the present invention, and which is connected to a passage MFc which corresponds to the second passage according to the present invention.

Also, in the branch passages MFr, MFl, are disposed normally open two-port two-position electromagnetic valves PC1, PC2 (hereinafter, simply referred to as valves PC1, PC2), respectively. In parallel with these valves PC1, PC2, check valves CV1, CV2 are provided, respectively, for permitting the brake fluid to flow in the direction toward the master cylinder MC and restraining the reverse flow, so that the brake fluid in the wheel cylinders Wfr, Wfl is returned to the master cylinder MC and then to the reservoir LRS through the check valves CV1, CV2 and the changeover valve STF placed in its first position as shown in FIG. 1. Accordingly, the hydraulic pressure in each of the wheel cylinders Wfr, Wfl is immediately decreased down to the pressure in the master cylinder MC at the time when the brake pedal BP has been released. There are disposed normally closed two-port two-position electromagnetic valves PC5, PC6 (hereinafter, simply referred to as valves PC5, PC6), in the branch passages RFr, RFl which are connected to the wheel cylinders Wfr, Wfl at their draining sides, respectively, and which are merged into a drain passage RF which is further connected to an auxiliary reservoir RSF.

In the front hydraulic pressure circuit, the pressure control device according to the present invention is called as a modulator which includes the valves PC1, PC2, PC5, PC6. As for the auxiliary pressure source, a fluid pump HP1 is disposed in a passage MFP which is connected to the branch passages MFr, MFl at the upstream of the valves PC1, PC2. The fluid pump HP1 has an inlet which is communicated with the changeover valve STF via a check valve CV5 through the passage MFc, and further communicated with the auxiliary reservoir RSF via check valves CV5 and CV9, and an outlet which is communicated with the valves PC1, PC2 via a check valve CV6. The fluid pump HP1 is adapted to be driven by a single electric motor M together with a fluid pump HP2, so as to introduce the brake fluid from the inlet and discharge from the outlet the brake fluid which has been pressurized and raised to a predetermined pressure. The auxiliary reservoir RSF is provided separately from the low-pressure reservoir LRS of the master cylinder MC for storing a sufficient amount of brake fluid required for various control modes which will be described later, and the auxiliary reservoir RSF is sometimes called as an accumulator.

With respect to three ports of the changeover valve STF, the first port is connected to the master cylinder MC, the second port is connected to the valves PC1, PC2, and the third port is connected to a position between the check valve CV5 and the check valve CV9 provided at the inlet side of the fluid pump HP1. A check valve CV6 is provided for permitting the brake fluid discharged from the fluid pump HP1 to flow in a certain direction. When the changeover valve STF is placed in its first position as shown in FIG. 1, the first port will be communicated with the second port, with the third port blocked, so that the master cylinder MC will be communicated with the valves PC1, PC2. When the changeover valve STF is placed in its second position, the first port will be communicated with the third port, with the second port blocked, so that the master cylinder MC will be communicated with the inlet of the fluid pump HP1 and the auxiliary reservoir RSF through the check valves CV5, CV9, respectively.

The first pressure chamber MCa of the master cylinder MC is further connected to the wheel cylinders Wfr, Wfl through an auxiliary passage AM and its branch passages AMr, AMl. In these passages AMr, AMl, are disposed normally closed two-port two-position electromagnetic valves SB1, SB2, and check valves AV1, AV2 for permitting the brake fluid to flow in the direction toward the wheel cylinders Wfr, Wfl and restraining the reverse flow, respectively. Those valves SB1, SB2 are opened when the braking force is applied irrespective of depression of the brake pedal BP, in such cases as the steering control by braking, the traction control, or the like. Those valves SB1, SB2 may be of normally open type. In parallel with the changeover valve STF, is provided a relief valve RVF which is adapted to return the brake fluid discharged from the fluid pump HP1 to the reservoir LRS through the master cylinder MC when the pressure of the discharged brake fluid exceeds a predetermined pressure, thereby to regulate the brake fluid discharged from the fluid pump HP1 to be of the certain pressure.

In the rear hydraulic pressure circuit, normally open two-port two-position electromagnetic valves PC3, PC4, normally closed two-port two-position electromagnetic valves PC7, PC8, check valves CV3, CV4, normally closed two-port two-position electromagnetic valves SB3, SB4, and check valves AV3, AV4, respectively. The fluid pump HP2 is driven by the electric motor M together with the fluid pump HP1. After the electric motor M has been started, both of the fluid pumps HP1, HP2 are continuously driven.

In operation, according to the first embodiment, all of the valves are placed in their normal positions as shown in FIG. 1, and the electric motor M is stopped, during the normal braking operation. When the brake pedal BP is depressed in that condition as shown in FIG. 1, the master cylinder MC is actuated to discharge the master cylinder pressure from the first and second pressure chambers MCa, MCb to the front and rear hydraulic pressure circuits, respectively. The front hydraulic pressure circuit will be described hereinafter to represent both circuits.

In the anti-skid control operation, if it is determined that the wheel FR tends to be locked, for example, the valve PC1 is closed, and the valve PC5 is opened, with the changeover valve STF placed in its first position. Consequently, the wheel cylinder Wfr is communicated with the auxiliary reservoir RSF through the valve PC5, so that the brake fluid in the wheel cylinder Wfr is drained into the auxiliary reservoir RSF to decrease the hydraulic pressure in the wheel cylinder Wfr. When the gradual increase mode is selected, the valve PC5 is placed in its closed position and the valve PC1 is placed in its open position, so that the pressurized brake fluid (master cylinder pressure) is discharged from the master cylinder MC to the wheel cylinder Wfr through the valve PC1 in its open position, and the pressurized brake fluid by the pump HP1 to the wheel cylinder Wfr through the valve PC1, as well. Then, the valve PC1 is energized and de-energized alternately to increase the pressure in the wheel cylinder Wfr and hold the same alternately, whereby the pressure in the wheel cylinder Wfr is increased intermittently in a pulse fashion, and as result increased gradually. When the rapid increase mode is selected for the wheel cylinder Wfr, the valves PC2, PC5 are placed in the closed positions, respectively, then the valve PC1 is placed in its open position, so that the master cylinder pressure is supplied from the master cylinder MC to the wheel cylinder Wfr. When the brake pedal BP is released and the master cylinder pressure comes to be lower than the pressure in the wheel cylinder Wfr, the brake fluid in the wheel cylinder Wfr is returned to the master cylinder MC through the check valve CV1 and the changeover valve STF placed in its first position, and consequently to the reservoir LRS. Thus, an independent braking force control may be made to an individual wheel so as to enable the anti-skid control independently for the individual wheel.

When the control mode is shifted to the traction control operation, and an acceleration slip control is made with respect to the wheel RR, for example, the valve PC4 is closed and the valve PC3 is placed in its open position, with the changeover valve STR placed in its second position. Then, the pump HP2 is driven by the motor M to introduce the brake fluid from the reservoir LRS through the changeover valve STR in its second position and the passage MRc, and discharge the pressurized brake fluid to the wheel cylinder Wrr for the driven wheel RR through the passage MR. If the valve PC3 is placed in its closed position, the hydraulic pressure in the wheel cylinder Wrr is held. Accordingly, even if the brake pedal BP is not depressed, when the acceleration slip control is made with respect to the wheel RR, for example, the valves PC3, PC7 are energized and de-energized alternately to provide a pressure control mode for increasing, gradually increasing, decreasing, gradually decreasing or holding the pressure in the wheel cylinder Wrr is set. As a result, the braking force is applied to the wheel RR to restrict the rotational force and prevent the acceleration slip. Consequently, the traction control is performed properly. With respect to the valve STR according to the present embodiment, when the brake fluid stored in the reservoir RSR is to be drained during the traction control operation, the valve STR is placed in its first position in the decreasing mode or holding mode, so that the brake fluid only in the reservoir RSR will be drained by the fluid pump HP2 without the brake fluid introduced into the fluid pump HP2 from the reservoir LRS through the master cylinder MC. When the brake pedal BP is depressed in this condition with respect to the wheels RR, RL, the larger braking force between the braking force applied in accordance with the steering control by braking and the braking force applied in response to depression of the brake pedal BP, is applied to the wheels RR, RL, so that the additional depression of the brake pedal BP can be made even when the brake fluid in the reservoir RSR is drained to the master cylinder during the traction control.

Furthermore, when the excessive oversteer, for example, is needed to be prevented in case of the steering control by braking, the moment for overcoming the excessive oversteer must be created. In this case, it is effective to apply the braking force only to a certain single wheel. That is, in the front hydraulic pressure circuit, the changeover valve STF is changed over to its second position, and the motor M is activated, so that the pressurized brake fluid is discharged from the fluid pump HP1. Also, the solenoid valve SB1 is energized to be placed in its open position. Then, with the solenoid valves PC1, PC2, PC5, PC6 energized or de-energized, the hydraulic pressure in each wheel cylinder is gradually increased, decreased, or held, in the rear hydraulic pressure circuit as well. Consequently, the braking force distribution between the front and rear wheels is controlled to keep the course trace characteristic of the vehicle.

When the brake pedal BP is depressed during the operation of the steering control by braking with respect to the wheel FR, the pressurized brake fluid is discharged from the master cylinder MC to the wheel cylinder Wfr through the passages AM, AMr, the valve SB1 placed in its open position, and the check valve AV1. As a result, in addition to the braking force applied to the wheel cylinder Wfr in accordance with the steering control by braking, the braking force can be applied in response to depression of the brake pedal BP, so that the additional depression of the brake pedal BP can be made. The steering control by braking with respect to the wheel FL is performed as well, so that the braking force can be applied to the wheel FL in response to depression of the brake pedal BP through the valve SB2 and the check valve AV2. Also, with respect to the wheels RR, RL, the pressurized brake fluid discharged from the master cylinder MC is supplied to the wheel cylinders Wrr, Wrl in response to depression of the brake pedal BP through the valves SB3, SB4 and the check valves AV3, AV4, so that the braking force can be applied to the wheels RR, RL in response to depression of the brake pedal BP.

As described before, according to the prior vehicle motion control system, when the steering control by braking with respect to each wheel will be performed during the vehicle is traveling, even if the brake pedal BP is depressed, sometimes it is difficult to shift the control mode to the direct mode for communicating the master cylinder MC with each wheel cylinder. Therefore, the pressure sensor or the like was provided for detecting the depression of the brake pedal BP in the prior system, thereby to cause increase in cost. On the contrary, according to the above-described embodiment, even if the steering control by braking with respect to each wheel is being performed, when the brake pedal BP is depressed, in the front hydraulic pressure circuit, for example, the pressurized brake fluid discharged from the master cylinder MC will be supplied to the wheel cylinders Wfr, Wfl through the valves SB1, SB2 and the check valves AV1, AV2, so that the braking force can be applied to the front wheels FR, FL in response to depression of the brake pedal BP. With respect to the valve STF (or, STR) according to the present embodiment, when the brake fluid stored in the reservoir RSF (or, RSR) is to be drained during the steering control by braking, the valve STF (or, STR) is placed in its first position in the decreasing mode or holding mode, so that the brake fluid only in the reservoir RSF (or, RSR) will be drained by the fluid pump HP1 (or, HP2) without the brake fluid introduced into the fluid pump HP1 (or, HP2) from the reservoir LRS through the master cylinder MC. When the brake pedal BP is depressed in this condition, the larger braking force between the braking force applied in accordance with the steering control by braking and the braking force applied in response to depression of the brake pedal BP, is applied to the wheels FR, FL, in one of the hydraulic pressure circuits including the same, for example, so that the additional depression of the brake pedal BP can be made even when the brake fluid in the reservoir RSF is drained to the master cylinder during the steering control by braking.

Thus, the changeover valves STF, STR and the valves SB1 to SB4 are controlled as follows;

| wheel to be controlled | control mode | solenoid valves | |
|---|---|---|---|
| FR | normal braking | STF | off |
|  |  | SB1 | off |
|  | anti-skid control | STF | off |
|  |  | SB1 | off |
|  | steering control by braking | STF | on/off |
|  |  | SB1 | on* |
| FL | normal braking | STF | off |
|  |  | SB2 | off |
|  | anti-skid control | STF | off |
|  |  | SB2 | off |
|  | steering control by braking | STF | on/off |
|  |  | SB2 | on* |
| RR | normal braking | STR | off |
|  |  | SB3 | off |
|  | anti-skid control | STR | off |
|  |  | SB3 | off |
|  | steering control by braking | STR | on/off |
|  |  | SB3 | on* |
|  | traction control | STR | on/off |
|  |  | SB3 | off |
|  | front-rear distribution control | STR | off |
|  |  | SB3 | off |
| RL | normal braking | STR | off |
|  |  | SB4 | off |
|  | anti-skid control | STR | off |
|  |  | SB4 | off |
|  | steering control by braking | STR | on/off |
|  |  | SB4 | on* |
|  | traction control | STR | on/off |
|  |  | SB4 | off |
|  | front-rear distribution control | STR | off |
|  |  | SB4 | off |

In the above table, the mark "*" indicates that when the control mode is shifted into the anti-skid control during the steering control by braking operation, the valve will be de-energized. With respect to "on/off" in the above table, "off" is made in such cases that the brake fluid in the reservoirs RSF, RSR is to be drained during the traction control and the steering control by braking.

Figure 5:
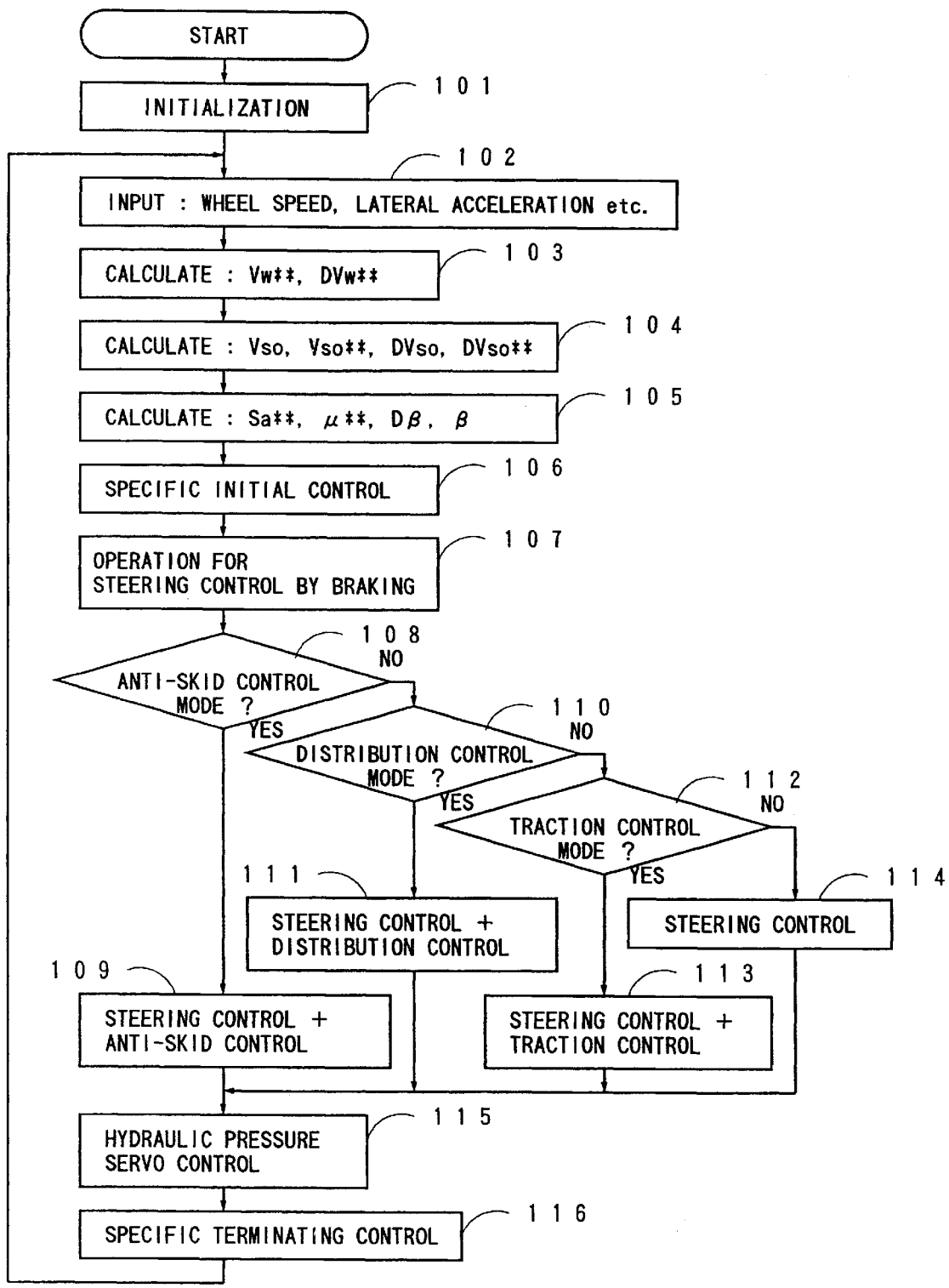
FIG. 5 is a flowchart showing a main routine of the vehicle motion control according to the first embodiment of the present invention.

According to the present embodiment as constituted above, a program routine for the vehicle motion control including the steering control by braking, anti-skid control and so on is executed by the electronic controller ECU, as will be described hereinafter with reference to FIGS. 5 to 8. The program routine starts when an ignition switch (not shown) is turned on. At the outset, the program for the vehicle motion control as shown in FIG. 5 provides for initialization of the system at Step 101 to clear various data. At Step 102, the signals detected by the wheel speed sensors WS1 to WS4 are read by the electronic controller ECU, and also read are the signal (steering angle δ f) detected by the front steering angle sensor SSf, the signal (actual yaw rate γ) detected by the yaw rate sensor YS, and the signal (actual lateral acceleration Gya) detected by the lateral acceleration sensor YG.

Then, the program proceeds to Step 103 where the wheel speed Vw of each wheel is calculated ( represents one of the wheels FL, FR, RL, RR), and differentiated to produce the wheel acceleration DVw of each wheel. Preferably, the wheel acceleration DVw is filtered to produce a normal wheel acceleration FDVw without noise. Next, at Step 104, an estimated vehicle speed Vso at the gravity center of the vehicle is calculated (Vso=MAX[Vw]), and an estimated vehicle speed Vso for each wheel is calculated, respectively, on the basis of the wheel speed Vw. And, the estimated vehicle speeds Vso and Vso are differentiated to provide a longitudinal vehicle acceleration DVso at the gravity center and a longitudinal vehicle acceleration DVso for each wheel, respectively. The estimated vehicle speed Vso may be normalized to reduce the error caused by a difference between the wheels located on the inside and outside of the curve while cornering. That is, the estimated and normalized vehicle speed NVso is calculated in accordance with the following equation:

$$NVso^{}=Vso^{}(n)-\Delta Vr^{**}(n)$$

where $\Delta Vr^{}(n)$ is a correction factor provided for correction during cornering, as follows: That is, the correction factor $\Delta Vr^{}(n)$ is set on the basis of a turning radius R and $\gamma \cdot VsoFW$ (FW represents front wheels) which is nearly equal to the lateral acceleration Gya, according to a map (not shown) provided for each wheel except for a reference wheel. If $\Delta VrFL$ is employed as a reference value for example, it is set to be zero. Then, $\Delta VrFR$ is set according to a map provided for the difference between two wheels located on the inside and outside of the curve during cornering. With respect to the rear wheels, $\Delta VrRL$ is set according to a map provided for the difference between two wheels both located on the inside of the curve during cornering, while $\Delta VrRR$ is set according to a map provided for the difference between two wheels both located on the outside of the curve during cornering, and also according to the map provided for the difference between two wheels located on the inside and the outside of the curve during cornering.

The program further proceeds to Step 105, where an actual slip rate Sa is calculated on the basis of the wheel speed Vw for each wheel and the estimated vehicle speed Vso (or, the estimated and normalized vehicle speed NVso) which are calculated at Steps 103 and 104**, respectively, in accordance with the following equation:

$$Sa^{}=(Vso-Vw^{})/Vso$$

On the basis of the vehicle acceleration DVso and the actual lateral acceleration Gya detected by the lateral acceleration sensor YG, the coefficient of friction $\mu^{}$ of each wheel against a road surface is calculated in accordance with the following equation:

$$\mu^{} \approx (DVso^{2}+Gya^2)^{1/2}$$

In order to detect the coefficient of friction against the road surface, various methods may be employed other than the above method, such as a sensor for directly detecting the coefficient of friction against the road surface, for example.

Also, at Step 105 a vehicle slip angle β which corresponds to a vehicle slip against the vehicle's path of motion, can be estimated as follows. That is, at the outset, the vehicle slip angular velocity Dβ, which is a differentiated value of the vehicle slip angle β, is calculated in accordance with the following equation:

$$D\beta=Gy/Vso-\gamma$$

where "Gy" is the lateral acceleration of the vehicle, "Vso" is the estimated vehicle speed of the vehicle measured at its gravity center, and "γ" is the yaw rate. Then, the vehicle slip angle β is calculated in accordance with the following equation:

$$\beta=\int D\beta dt$$

The vehicle slip angle β may be calculated in accordance with the following equation:

$$\beta=\tan^{-1}(Vy/Vx)$$

where "Vx" is a longitudinal vehicle speed, and "Vy" is a lateral vehicle speed.

Then, the program proceeds to Step 106 where a specific initial control for providing initial pressure is performed, and then to Step 107 where an operation for the steering control by braking is made to provide a desired slip rate for use in the steering control by braking, wherein the braking force applied to each wheel is controlled at Step 114 through the hydraulic pressure servo control which will be performed later at Step 115, so that the pressure control apparatus PC is controlled in response to the condition of the vehicle in motion. The steering control by braking is to be added to each control performed in all the control modes described later. The specific initial control may be performed before the steering control by braking starts, and also may be performed before the traction control starts, but it shall be terminated immediately after the anti-skid control starts. Then, the program proceeds to Step 108, where it is determined whether the condition for initiating the anti-skid control is fulfilled or not. If it is determined that the condition is in the anti-skid control mode, the specific initial control is terminated immediately at Step 109, where a control mode performing both the steering control by braking and the anti-skid control start.

If it is determined at Step 108 that the condition for initiating the anti-skid control has not been fulfilled, then the program proceeds to Step 110 where it is determined whether the condition for initiating the front and rear braking force distribution control is fulfilled or not. If it is affirmative at Step 110, the program further proceeds to Step 111 where a control mode for performing both the steering control by braking and the braking force distribution control is performed, otherwise it proceeds to Step 112, where it is determined whether the condition for initiating the traction control is fulfilled or not. If the condition for initiating the traction control is fulfilled, the program proceeds to Step 113 where a control mode for performing both the steering control by braking and the traction control is performed. Otherwise, a control mode for performing only the steering control by braking is set at Step 114. On the basis of the control modes as set in the above, the hydraulic pressure servo control is performed at Step 115, then the program proceeds to Step 116 where a specific terminating control is performed, and then the program returns to Step 102. If the control mode for steering control by braking is set at Step 107, the changeover valves STF, STR and valves SB1 to SB4 are energized to be placed in the second position and the open position, respectively, before the pressure servo control is performed at Step 115. In accordance with the control modes set at Steps 109, 111, 113, 114, the sub-throttle opening angle for the throttle control apparatus TH may be adjusted in response to the condition of the vehicle in motion, so that the output of the engine EG could be reduced to limit the driving force produced thereby.

According to the above-described anti-skid control mode, the braking force applied to each wheel is controlled so as to prevent the wheel from being locked during the vehicle braking operation. In the front-rear braking force distribution control mode, a distribution between the braking force applied to rear wheels and the braking force applied to front wheels is controlled so as to maintain the vehicle stability during the vehicle braking operation. Further, in the traction control mode, the braking force is applied to the driven wheel, and the throttle control is performed, so as to prevent the driven wheel from slipping during the vehicle driving operation.

Figure 6:
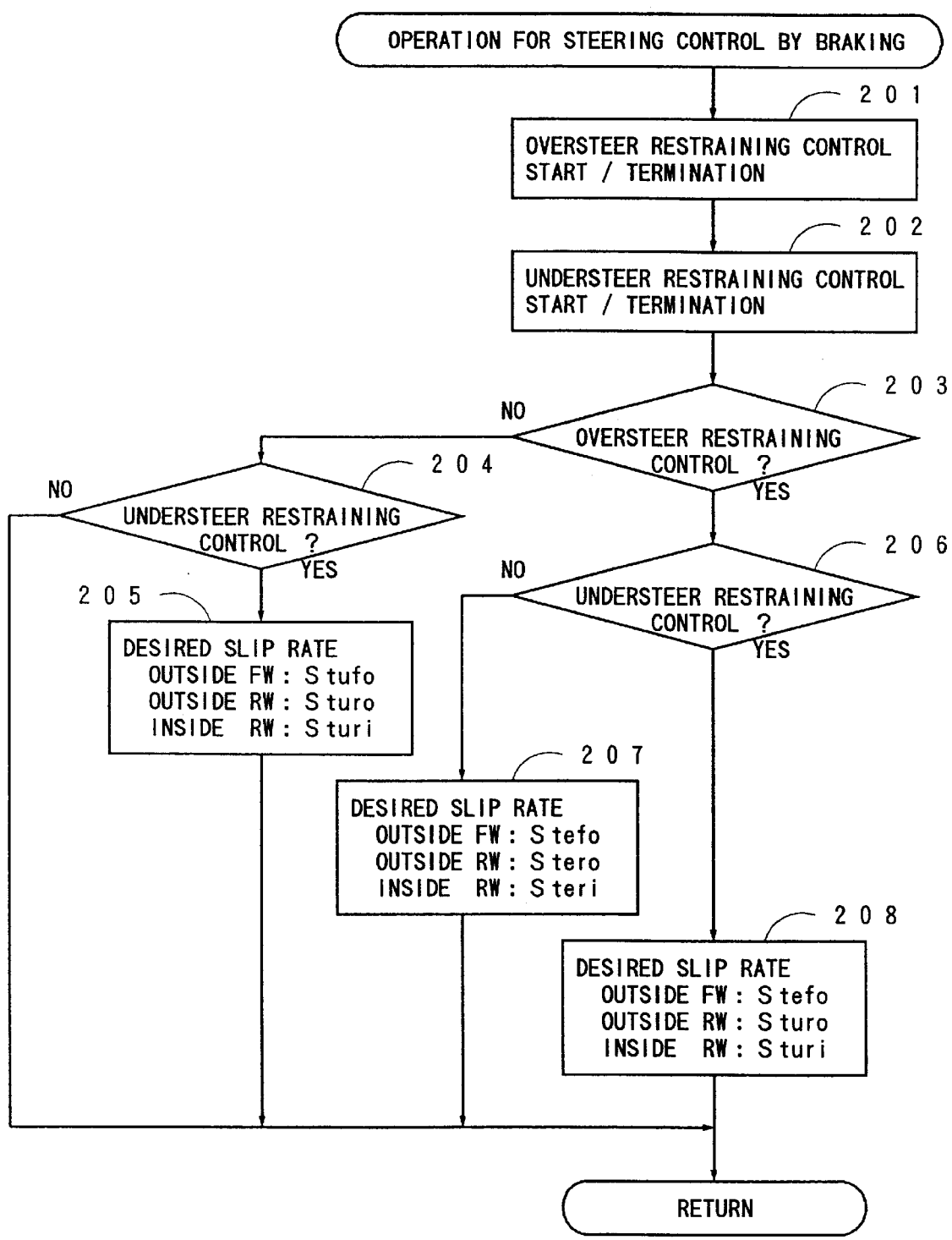
FIG. 6 is a flowchart showing a sub-routine of a steering control by braking according to the first embodiment of the present invention.
Figure 9:
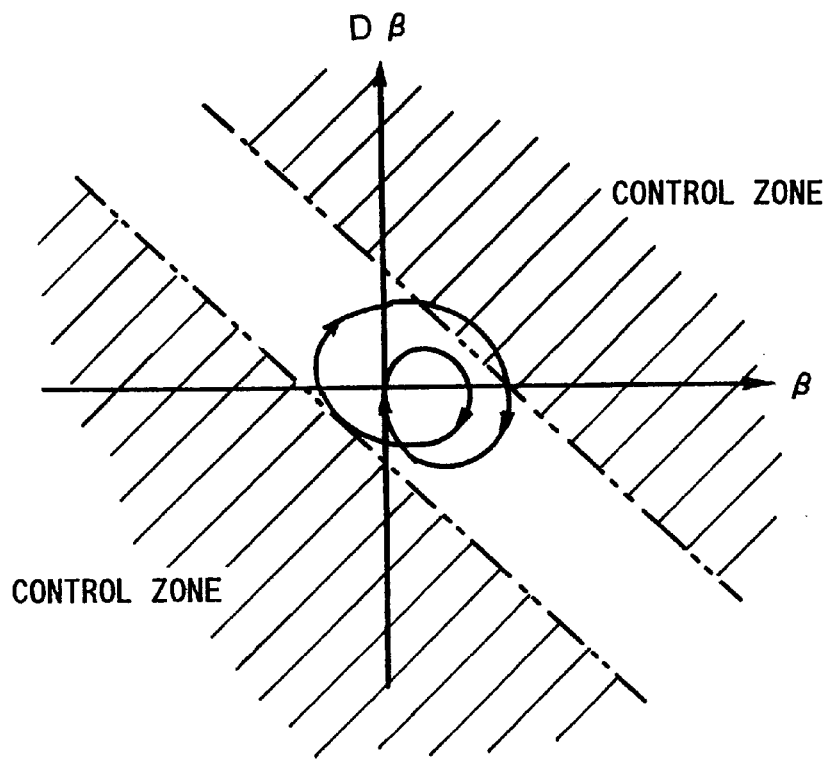
FIG. 9 is a diagram showing a region for determining start and termination of the oversteer restraining control according to first embodiment of the present invention.

FIG. 6 shows a flowchart for setting desired slip rates which are to be provided at Step 107 in FIG. 5 for the operation of the steering control by braking, which includes the oversteer restraining control and the understeer restraining control. Through this flowchart, therefore, the desired slip rates are set in accordance with the oversteer restraining control and/or the understeer restraining control. At the outset, it is determined at Step 201 whether the oversteer restraining control is to be started or terminated, and also determined at Step 202 whether the understeer restraining control is to be started or terminated. More specifically, the determination is made at Step 201 on the basis of the determination whether it is within a control zone indicated by hatching on a β–Dβ plane as shown in FIG. 9. That is, if the vehicle slip angle β and the vehicle slip angular velocity Dβ which are calculated when determining the start or termination, are fallen within the control zone, the oversteer restraining control will be started. However, if the vehicle slip angle β and the vehicle slip angular velocity Dβ come to be out of the control zone, the oversteer restraining control will be controlled as indicated by the arrow in FIG. 9 thereby to be terminated. And, the braking force applied to each wheel is controlled in such a manner that the farther they remote from the boundary between the control zone and non-control zone (as indicted by two dotted chain line in FIG. 9) toward the control zone, the more the amount to be controlled will be provided.

Figure 10:
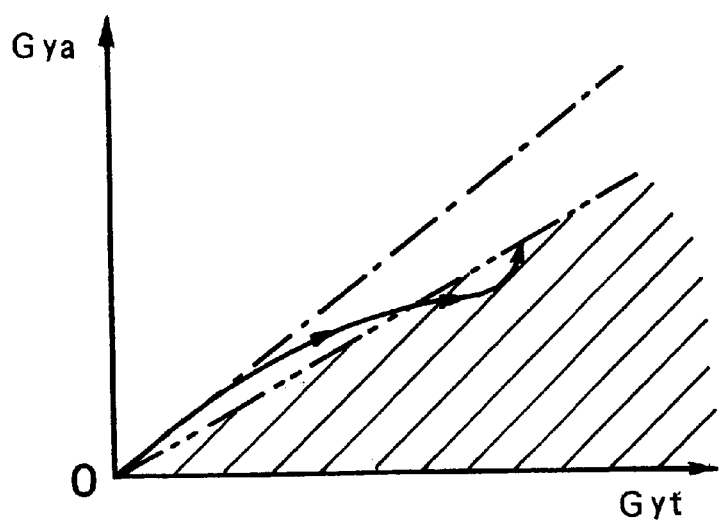
FIG. 10 is a diagram showing a region for determining start and termination of the understeer restraining control according to first embodiment of the present invention.

On the other hand, the determination of the start and termination is made at Step 202 on the basis of the determination whether it is within a control zone indicated by hatching in FIG. 10. That is, in accordance with the variation of the actual lateral acceleration Gya against a desired lateral acceleration Gyt, if they become out of the desired condition as indicated by one dotted chain line, and fallen within the control zone, then the understeer restraining control will be started. If they come to be out of the zone, the understeer restraining control will be controlled as indicated by the arrow in FIG. 10 thereby to be terminated.

Then, the program proceeds to Step 203 where it is determined whether the oversteer restraining control is to be performed or not. If the oversteer restraining control is not to be performed, the program further proceeds to Step 204 where it is determined whether the understeer restraining control is to be performed or not. In the case where the understeer restraining control is not to be performed, the program returns to the main routine. In the case where it is determined at Step 204 that the understeer restraining control is to be performed, the program proceeds to Step 205 where the desired slip rate of each wheel is set to a desired slip rate which is provided for use in the understeer restraining control. If it is determined at Step 203 that the oversteer restraining control is to be performed, the program proceeds to Step 206 where it is determined whether the understeer restraining control is to be performed or not. In the case where the understeer restraining control is not to be performed, the program proceeds to Step 207 where the desired slip rate of each wheel is set to a desired slip rate which is provided for use in the oversteer restraining control. In the case where it is determined at Step 206 that the understeer restraining control is to be performed, the program proceeds to Step 208 where the desired slip rate of each wheel is set to a desired slip rate which is provided for use in both of the oversteer restraining control and the understeer restraining control.

With respect to the desired slip rate for use in the oversteer restraining control, the vehicle slip angle β and the vehicle slip angular velocity Dβ are employed. With respect to the desired slip rate for use in the understeer restraining control, a difference between the desired lateral acceleration Gyt and the actual acceleration Gya is employed. The desired lateral acceleration Gyt is calculated in accordance with the following equations:

$$Gyt=\gamma(\theta f)\cdot Vso;$$

$$\gamma(\theta f)=(\theta f/N\cdot L)\cdot Vso/(1+Kh\cdot Vso^2)$$

where "Kh" is a stability factor, "N" is a steering gear ratio, and "L" is a wheel base of the vehicle.

At Step 205, the desired slip rate of a front wheel located on the outside of the curve of the vehicle's path is set as "Stufo", the desired slip rate of a rear wheel located on the outside of the curve is set as "Sturo", and the desired slip rate of a wheel located on the inside of the curve is set as "Sturi". As for the slip rate, "t" indicates a desired value, which is comparable with a measured value indicated by "a" as described later. "u" indicates the understeer restraining control, "r" indicates the rear wheel, "o" indicates the outside of the curve, and "i" indicates the inside of the curve, respectively. At Step 207, the desired slip rate of the front wheel located on the outside of the curve is set as "Stefo", the desired slip rate of the rear wheel located on the outside of the curve is set as "Stero", and the desired slip rate of the rear wheel located on the inside of the curve is set as "Steri", wherein "e"indicates the oversteer restraining control. As noted previously, "FW" indicates a front wheel and "RW" indicates a rear wheel.

At Step 208, the desired slip rate of the front wheel located on the outside of the curve is set as "Stefo", the desired slip rate of the rear wheel located on the outside of the curve is set as "Sturo", and the desired slip rate of the rear wheel located on the inside of the curve is set as "Sturi". That is, when both of the oversteer restraining control and the understeer restraining control are performed simultaneously, the desired slip rate of the front wheel located on the outside of the curve is set to be the same rate as the desired slip rate for use in the oversteer restraining control, while the desired slip rates of the rear wheels are set to be the same rates as the desired slip rates for use in the understeer restraining control. In any cases, however, a front wheel located on the inside of the curve, i.e., a non-driven wheel of a rear drive vehicle is not to be controlled, because this wheel is employed as a reference wheel for use in calculation of the estimated vehicle speed.

The desired slip rates Stefo, Stero and Steri for use in the oversteer restraining control are calculated in accordance with the following equations, respectively:

$$Stefo=K1\cdot\beta+K2\cdot D\beta$$

$$Stero=K3\cdot\beta+K4\cdot D\beta$$

$$Steri=K5\cdot\beta+K6\cdot D\beta$$

where K1 to K6 are constants which are set so as to provide the desired slip rates Stefo, Stero which are used for increasing the braking pressure (i.e., increasing the braking force), and the desired slip rate Steri which is used for decreasing the braking pressure (i.e., decreasing the braking force).

On the contrary, the desired slip rates Stufo, Sturo and Sturi for use in the understeer restraining control are calculated in accordance with the following equations, respectively:

$$Stufo = K7 \cdot \Delta Gy$$

$$Sturo = K8 \cdot \Delta Gy$$

$$Sturi = K9 \cdot \Delta Gy$$

where K7 is a constant for providing the desired slip rate Stufo which is used for increasing the braking pressure (or, alternatively decreasing the braking pressure), while K8 and K9 are constants for providing the desired slip rates Sturo, Steri both of which are used for increasing the braking pressure. These constants K7 to K9 are set to satisfy K8=K9 and K7≦K9/2.

Figure 7:
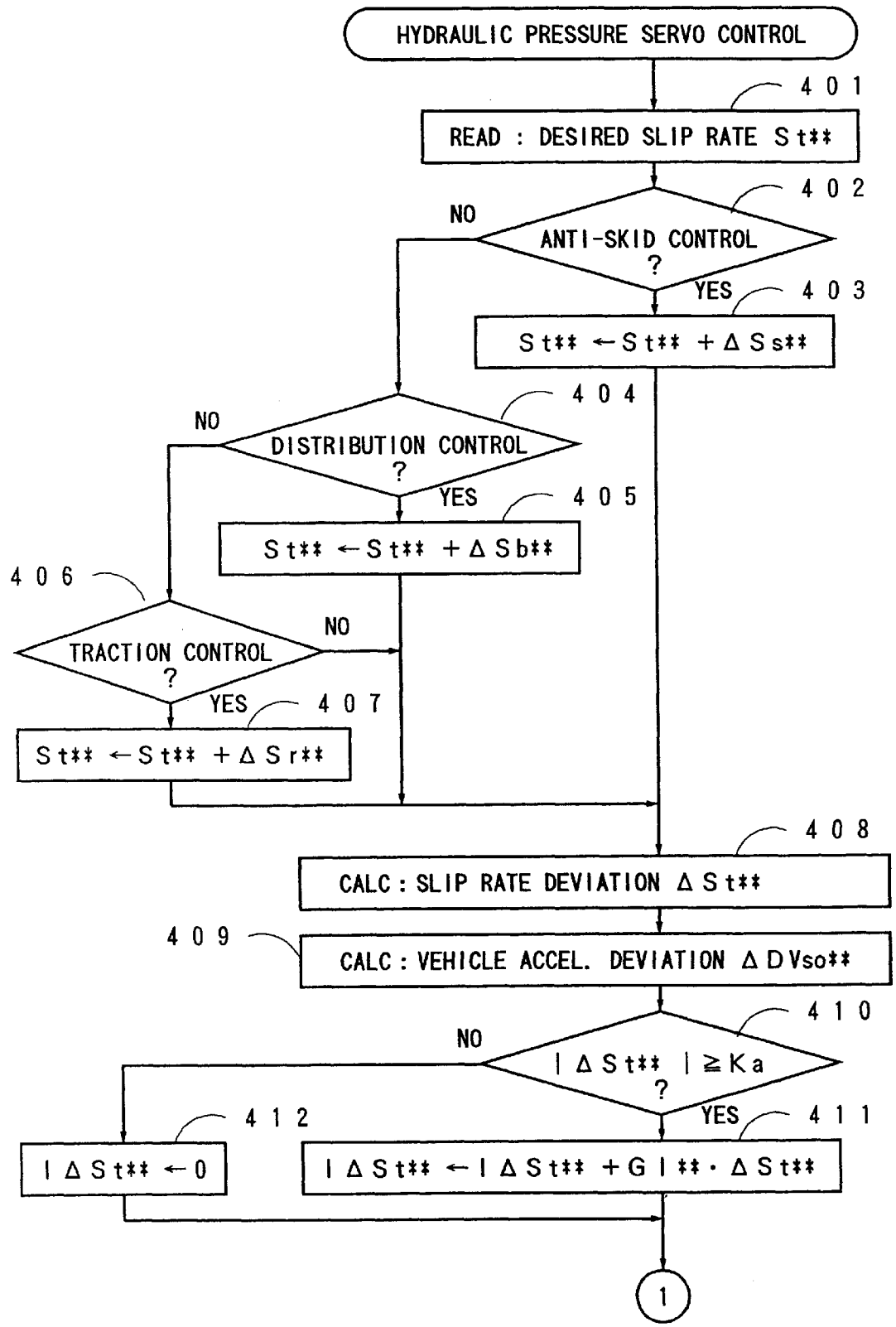
FIG. 7 is a flowchart showing a hydraulic pressure servo control according to the first embodiment of the present invention.
Figure 8:
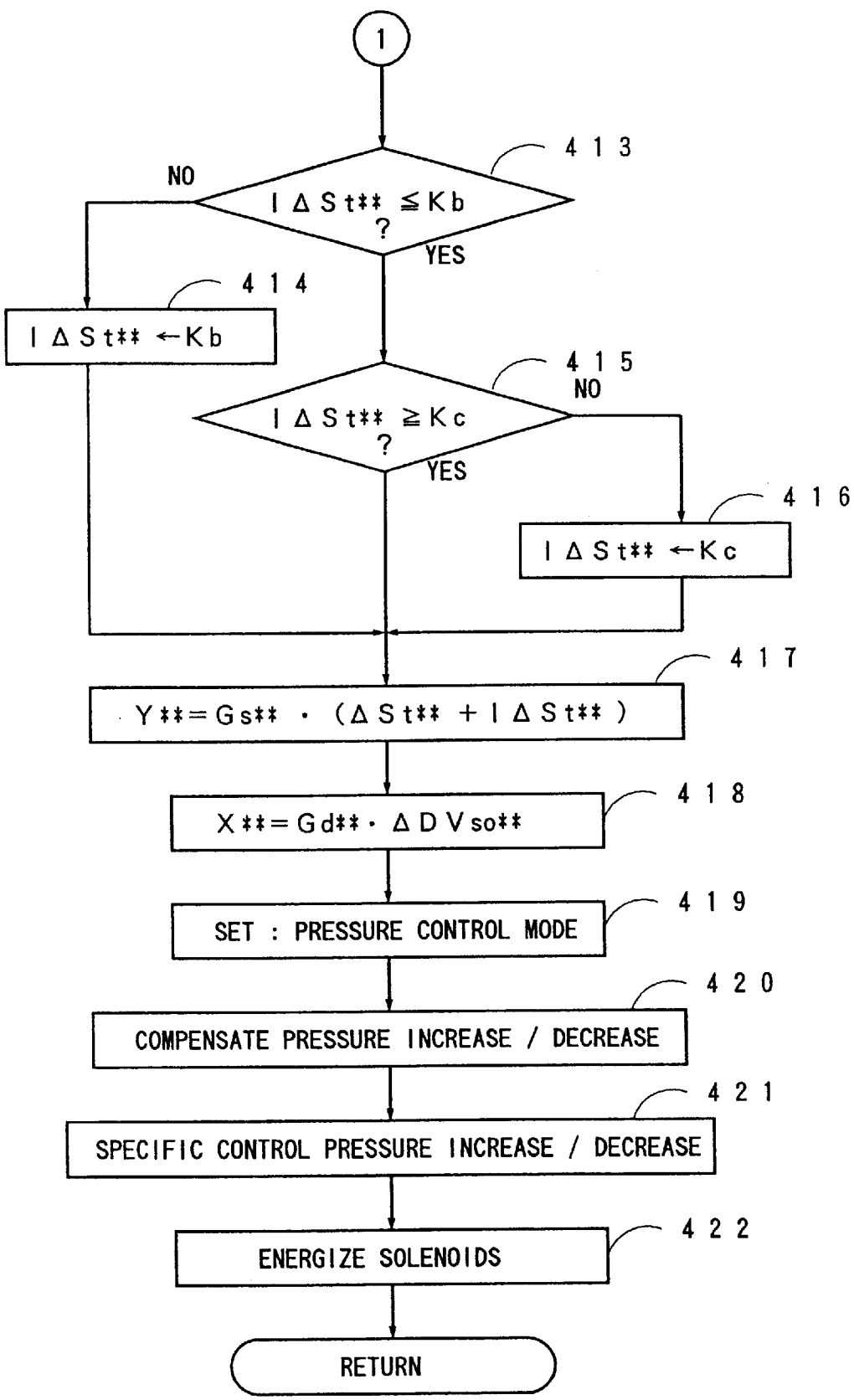
FIG. 8 is a flowchart showing a hydraulic pressure servo control according to the first embodiment of the present invention.

FIGS. 7 and 8 show the hydraulic pressure servo control which is executed at Step 115 in FIG. 5, and wherein the wheel cylinder pressure for each wheel is controlled through the slip rate servo control. At Step 401, the desired slip rates St, which are set at Step 205, 207 or 208, are read to provide the desired slip rate for each wheel of the vehicle. Then, the program proceeds to Step 402 where it is determined whether the anti-skid control is to be performed or not. If the result is affirmative, the program proceeds to Step 403 where a compensating slip rate for the anti-skid control ΔSs is added to the desired slip rate St to renew the desired slip rate St. If it is determined at Step 402 that the anti-skid control operation is not to be performed, the program proceeds to Step 404 where it is determined whether a front and rear braking force distribution control is to be performed or not. If the result is affirmative, the program proceeds to Step 405 where a compensating slip rate for the braking force distribution control ΔSb is added to the desired slip rate St to renew it. If it is determined at Step 404 that the braking force distribution control is not to be performed, the program proceeds to Step 406 where it is determined whether a traction control is to be performed or not. If the result is affirmative, the program proceeds to Step 407 where a compensating slip rate for the traction control ΔSr is added to the desired slip rate St to renew it. After the desired slip rate St is renewed at Step 403, 405 or 407, the program proceeds to Step 408, where a slip rate deviation ΔSt is calculated for each wheel, and further proceeds to Step 409 where a vehicle acceleration deviation ΔDVso** is calculated. If it is determined at Step 406 that the traction control is not to be performed, the program directly proceeds to Step 408.

At Step 408, the difference between the desired slip rate St and the actual slip rate Sa is calculated to provide the slip rate deviation ΔSt (i.e., ΔSt=St−Sa). And, at Step 409, the difference between the vehicle acceleration DVso of a wheel to be controlled and that of the reference wheel (i.e., non-driven wheel) is calculated to provide the vehicle acceleration deviation ΔDVso. The actual slip rate Sa and the vehicle acceleration deviation ΔDVso may be calculated in accordance with a specific manner which is determined in dependence upon the control modes such as the anti-skid control mode, traction control mode, or the like.

Then, the program proceeds to Step 410 where the slip rate deviation ΔSt is compared with a predetermined value Ka. If an absolute value of the slip rate deviation |ΔSt| is equal to or greater than the predetermined value Ka, the program proceeds to Step 411 where an integrated value (I ΔSt) of the slip rate deviation ΔSt is renewed. That is, a value of the slip rate deviation ΔSt multiplied by a gain GI is added to the integrated value of the slip rate deviation I ΔSt obtained at the previous cycle of this routine to provide the integrated value of the slip rate deviation I ΔSt at the present cycle. If the absolute value of the slip rate deviation |ΔSt| is smaller than the predetermined value Ka, the program proceeds to Step 412 where the integrated value of the slip rate deviation I ΔSt is cleared to be zero (0). Then, the program proceeds to Steps 413 to 416 as shown in FIG. 8 where the slip rate deviation I ΔSt is limited to a value which is equal to or smaller than an upper limit value Kb, or which is equal to or greater than a lower limit value Kc. If the slip rate deviation I ΔSt is greater than the upper limit Kb, it is set to be the value Kb at Step 414, whereas if the slip rate deviation I ΔSt** is smaller than the lower limit Kc, it is set to be the value Kc at Step 417.

Figure 11:
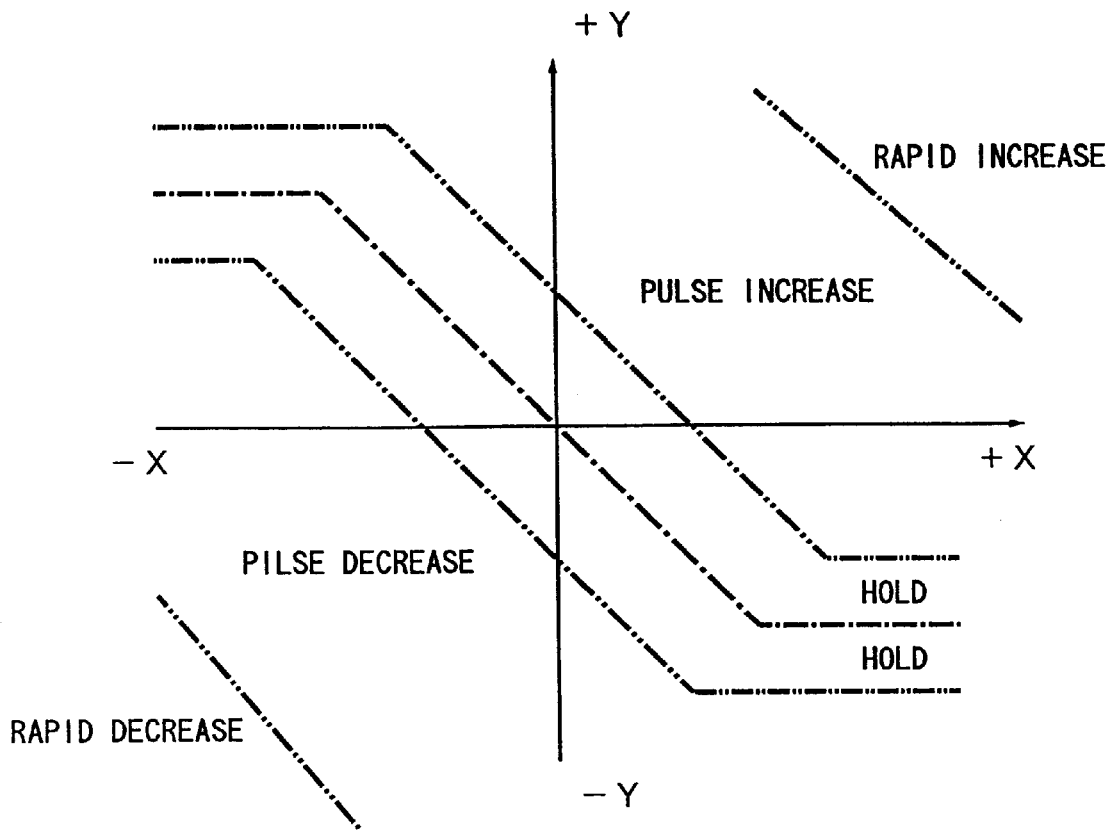
FIG. 11 is a diagram showing the relationship between the pressure control modes and parameters for use in the hydraulic braking pressure control according to the first embodiment.
Figure 12:
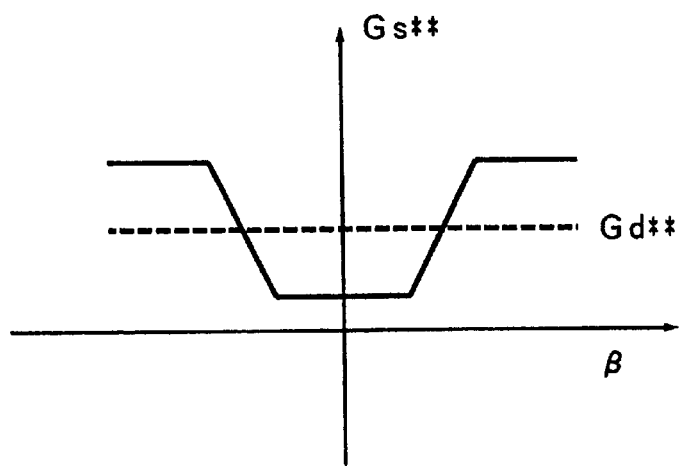
FIG. 12 is a diagram showing the relationship between a vehicle slip angle and a gain for calculating the parameters according to the first embodiment.

Thereafter, the program proceeds to Step 417 where a parameter Y** for providing a hydraulic pressure control in each control mode is calculated in accordance with the following equation:

$$Y^{} = Gs^{} \cdot (\Delta St^{} + I \Delta St^{})$$

where "Gs" is a gain, which is provided in response to the vehicle slip angle β and in accordance with a diagram as shown by a solid line in FIG. 12. The program further proceeds to Step 418 where another parameter X is calculated in accordance with the following equation:

$$X^{} = Gd^{} \cdot \Delta DVso^{**}$$

where "Gd" is a gain which is a constant value as shown by a broken line in FIG. 12. On the basis of the parameters X and Y, a pressure control mode for each wheel is provided at Step 419, in accordance with a control map as shown in FIG. 11. The control map has a rapid pressure decreasing zone, a pulse pressure decreasing zone, a pressure holding zone, a pulse pressure increasing zone, and a rapid pressure increasing zone which are provided in advance as shown in FIG. 11, so that any one of the zones is selected in accordance with the parameters X and Y** at Step 419. At Step 420, is performed a pressure increase and decrease compensating control, which is required for smoothing the first transition and last transition of the hydraulic pressure, when the presently selected zone is changed from the previously selected zone at Step 419, e.g., from the pressure increasing zone to the pressure decreasing zone, or vice versa. For instance, when the zone is changed from the rapid pressure decreasing zone to the pulse pressure increasing zone, for instance, a rapid pressure increasing control is performed for a period which is determined on the basis of a period during which a rapid pressure decrease mode, which was provided immediately before the rapid pressure increasing control, lasted. Finally, the program proceeds to Step 421 where the solenoid of each valve in the hydraulic pressure control apparatus PC is energized or de-energized in accordance with the mode determined by the selected pressure control zone or the pressure increase and decrease compensating control thereby to control the braking force applied to each wheel.

According to the above-described embodiment, the steering control by braking is performed irrespective of depression of the brake pedal BP to provide the oversteer restraining control and/or the understeer restraining control. Even in the case where the brake pedal BP is depressed to brake the vehicle, the steering control by braking is performed, as well. If the brake pedal BP is depressed during the steering control by braking operation, the braking force is applied to each wheel to increase the braking force, so that the braking operation can be made in accordance with the driver's intention. According to the above-described embodiment, the braking force is controlled in accordance with the slip rate. As to a desired parameter for use in the oversteer restraining control and the understeer restraining control, however, any desired parameters corresponding to the braking force applied to each wheel, other than the slip rate, may be employed, such as the hydraulic pressure in each wheel brake cylinder, for example.

Figure 2:
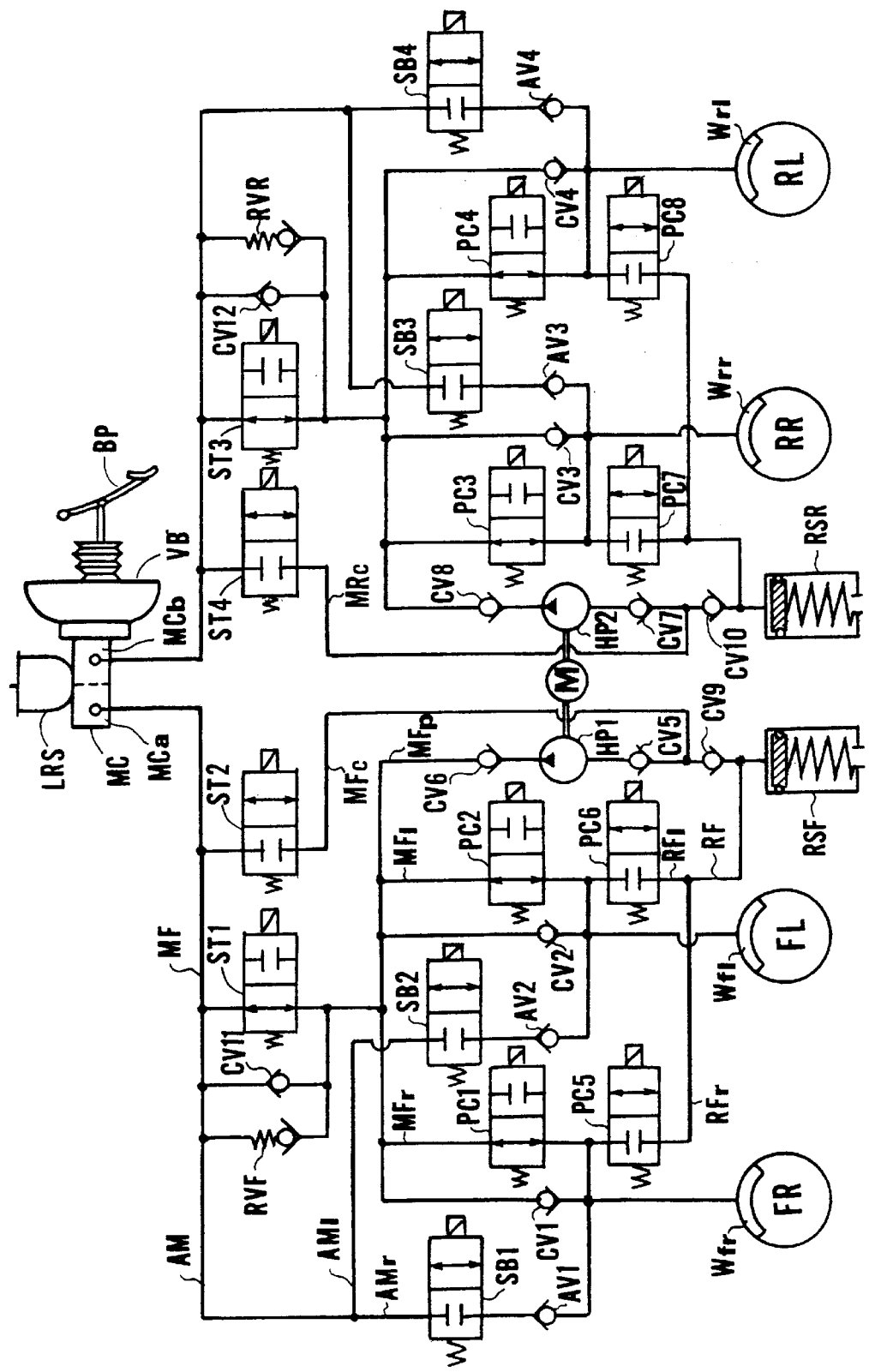
FIG. 2 is a block diagram illustrating a hydraulic braking system according to a second embodiment of the present invention.

FIG. 2 shows a second embodiment of the present invention, which is similar to the first embodiment, so that substantially the same parts as those disclosed in FIG. 1 are indicated by the same reference numerals as those disclosed in FIG. 1. Instead of the changeover valve STF in FIG. 1, a pair of two-port two-position electromagnetic valves ST1, ST2 are provided in FIG. 2, and a pair of two-port two-position electromagnetic valves ST3, ST4 are provided instead of the changeover valve STR. The valves ST1, ST2 have substantially the same function as the valve STF, and the valves ST3, ST4 have substantially the same function as the valve STR. The valve ST1 is disposed in the main passage MF (i.e., the first passage) with its one port connected to the master cylinder MC and the other port connected to the valves PC1, PC2. The valve ST2 has one port which is connected to the master cylinder MC and the other port which is connected to the passage MFc (i.e., the second passage) to communicate with the inlet of the pump HP1 through the check valve CV5. The valve ST2 is opened when the brake fluid in the reservoir LRS is to be introduced into the fluid pump HP1 through the master cylinder MC, during the steering control by braking, or the traction control, for example. In parallel with the valve ST1, a check valve CV11 for permitting the brake fluid to flow only from the master cylinder MC to the wheel cylinders, and the relief valve RVF are disposed. Likewise, a check valve CV12, the valves ST3, ST4, the passage MRc (i.e., the second passage) and the relief valve RVR are disposed in the rear hydraulic pressure circuit. According to the present embodiment, with those relief valves RVF, RVR incorporated into the pressure control as described before, all of the valves ST1 to ST4 may be placed in their closed positions. In other words, even in the case where both of the valves ST3, ST4 are closed for example, if the pressure in the passages extending from the valve ST3 to the wheel cylinders Wrr, Wrl is higher than the output pressure of the master cylinder MC to exceed the threshold level of the relief valve RVR, then the brake fluid will be returned into the master cylinder MC through the relief valve RVR.

Figure 3:
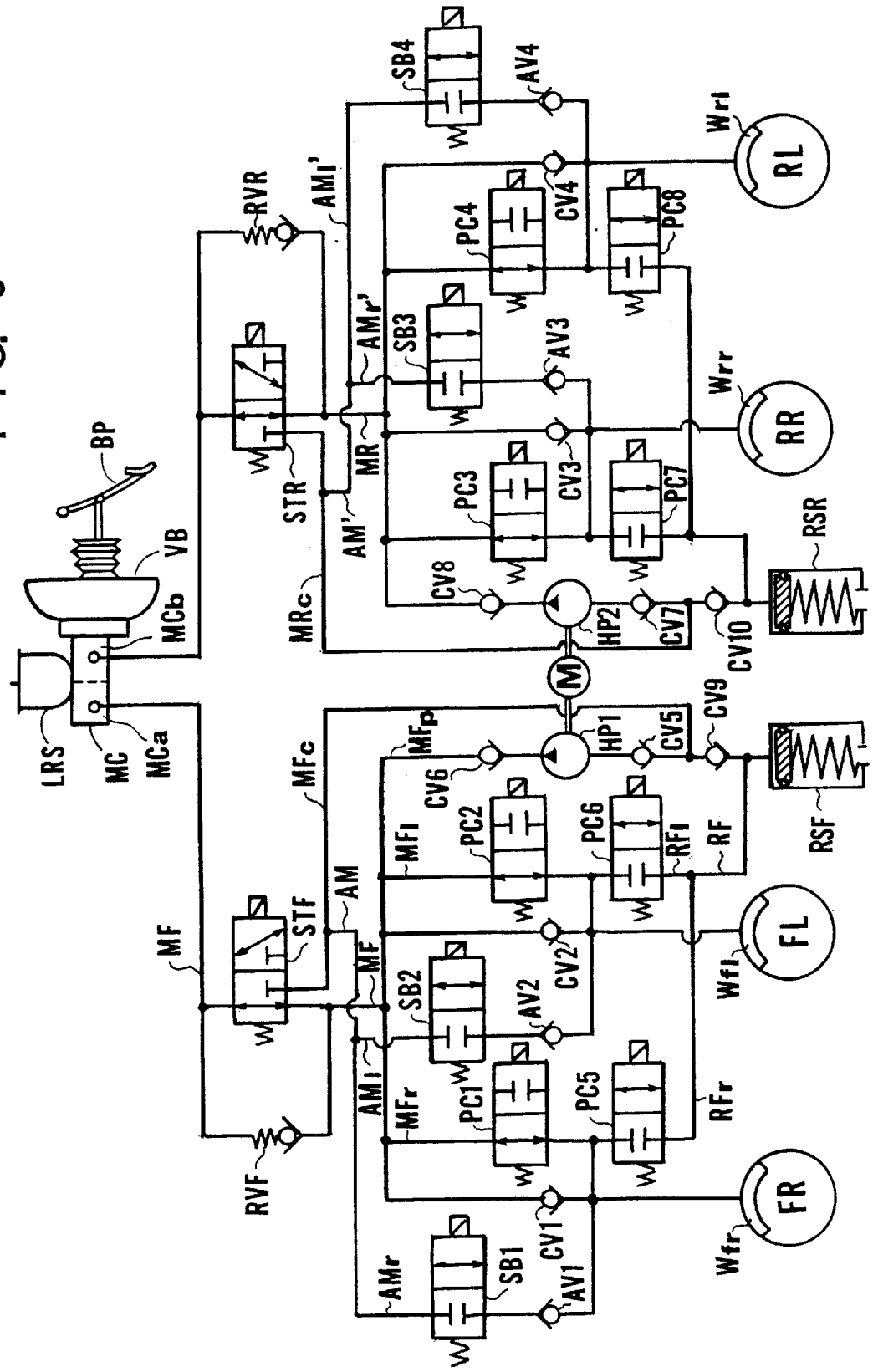
FIG. 3 is a block diagram illustrating a hydraulic braking system according to a third embodiment of the present invention.

FIG. 3 shows a third embodiment of the present invention, which is also similar to the first embodiment. In FIG. 3, the first pressure chamber MCa is communicated with the wheel cylinders Wfr, Wfl through the main passage MF which corresponds to the main passage of the first passage according to the present invention, the branch passage MFr (corresponding to the first branch passage), and the branch passage MFl (corresponding to the second branch passage). The fluid pump HP1 has the inlet which is communicated with the changeover valve STF via the check valve CV5 and also communicated with the auxiliary reservoir RSF via the check valves CV5 and CV9, and the outlet which is communicated with the valves PC1, PC2 via the check valve CV6. With respect to three ports of the changeover valve STF, the first port is connected to the master cylinder MC, the second port is connected to the valves PC1, PC2, and the third port is connected to a position between the check valve CV5 and the check valve CV9 through the passage MFc. In the present embodiment, the auxiliary passage AM is connected to the passage MFc. The passage AMr corresponds to the first auxiliary passage according to the present invention, and the passage AMl corresponds to the second auxiliary passage. In these passages AMr, AMl, the valves SB1, SB2 and the check valves AV1, AV2 are disposed, respectively. The remaining parts are substantially the same as those in the first embodiment as shown in FIG. 1, so that further explanation will be omitted.

Accordingly, when the braking force is applied to the rear wheels RR, RL to prevent the excessive understeer during the steering control by braking is being performed, for example, the motor M is activated, the changeover valve STR is changed over to its second position, and the valves SB3, SB4 are opened. As a result, the brake fluid in the reservoir LRS is introduced into the fluid pump HP2 through the master cylinder MC, the changeover valve STR and the passage MRc, and the pressurized brake fluid is discharged from the fluid pump HP2 into the wheel cylinders Wrr, Wrl through the valves PC3, PC4. Then, with the solenoid valves PC3, PC4, PC7, PC8 energized and de-energized, the hydraulic pressure in each wheel cylinder is rapidly increased, gradually increased, gradually decreased, rapidly decreased and held, so that the excessive understeer will be prevented.

When the brake pedal BP is depressed during the steering control by braking is being performed with respect to the rear wheels RR, RL, the pressurized brake fluid is discharged from the master cylinder MC to the wheel cylinder Wrr through the changeover valve STR in its second position, the valve SB3 in its open position and the passage AMr', and discharged to the wheel cylinder Wrl through the changeover valve STR in its second position, the valve SB4 in its open position and the passage AMl'. In response to depression of the brake pedal BP, therefore, the braking force can be applied to the wheels RR, RL. Thus, when the brake pedal BP is depressed during the steering control by braking is being performed with respect to the rear wheels RR, RL, the larger braking force between the braking force applied in accordance with the steering control by braking and the braking force applied in response to depression of the brake pedal BP, is applied to the rear wheels, so that the additional depression of the brake pedal BP can be made. With respect to the front wheels, when the brake pedal BP is depressed during the steering control by braking is being performed, the larger braking force between the braking force applied in accordance with the steering control by braking and the braking force applied in response to depression of the brake pedal BP can be applied to the wheels, as well.

In the case where the brake pedal BP is depressed during the steering control by braking is being performed with respect to the rear wheels RR, RL, and only one wheel RR tends to be locked, the anti-skid control is to be made. In this case, the valve SB3 is closed, with the changeover valve STR held in the second position, whereby the passage AMr' is shut off to prevent the pressurized brake fluid from being supplied to the wheel cylinder Wrl in response to the additional depression of the brake pedal BP. Thereafter, the valves PC3, PC7 are energized and de-energized to perform the anti-skid control. In this case, the other wheel RL does not tend to be locked, so that the steering control by braking is to be continued. Therefore, with the valve SB4 held to be opened, the steering control by braking and the additional depression will be continued with respect to the wheel cylinder Wrl. In the case where the brake pedal BP is depressed during the steering control by braking is being performed with respect to the rear wheels RR, RL, and both of the wheels RR, RL tend to be locked, the changeover valve STR is placed in the first position, and the valves SB3, SB4 are closed. As a result, with respect to the rear wheels RR, RL, the additional depression and the steering control by braking will be terminated to perform the anti-skid control.

Figure 4:
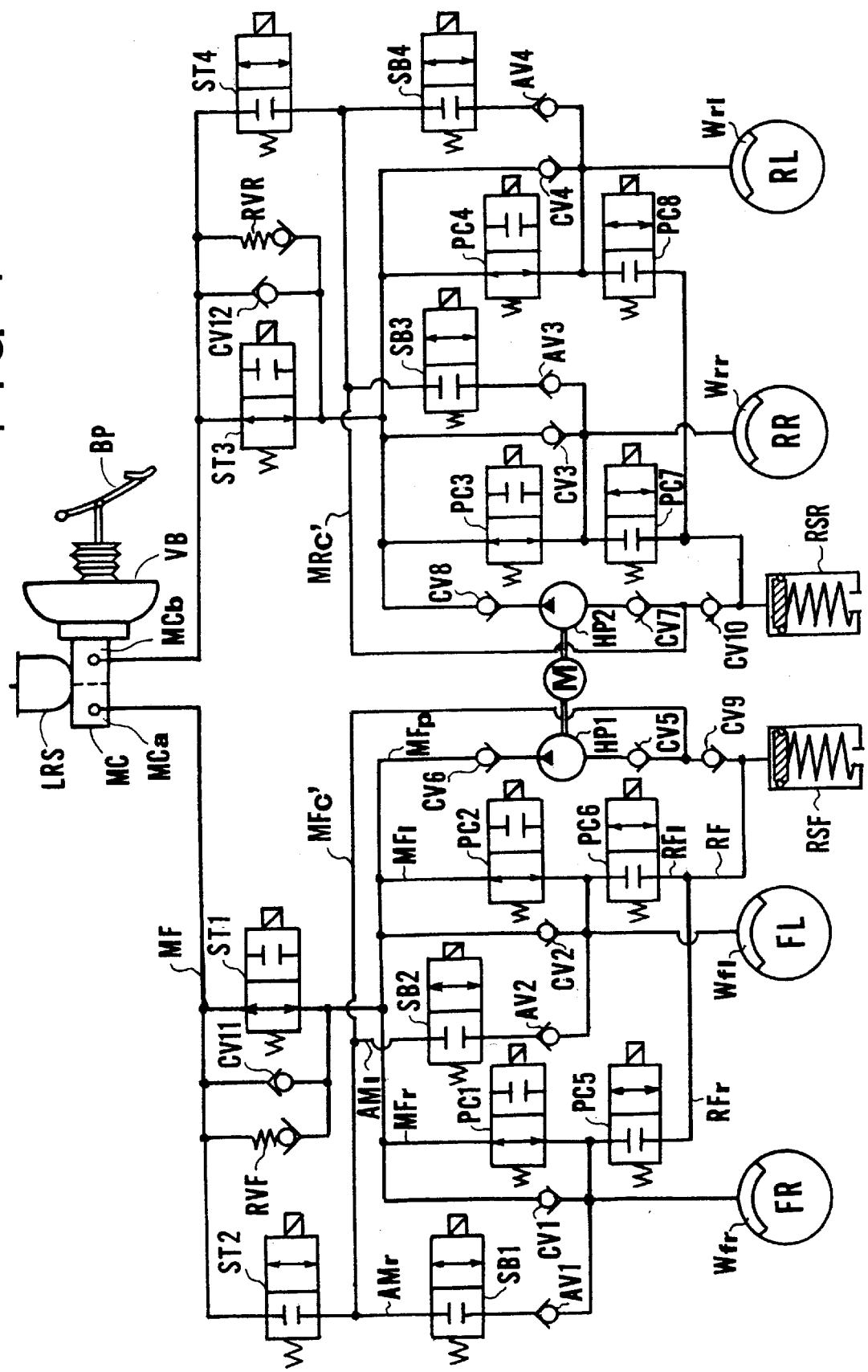
FIG. 4 is a block diagram illustrating a hydraulic braking system according to a fourth embodiment of the present invention.

FIG. 4 shows a fourth embodiment of the present invention, which is similar to the third embodiment, but different in the following structure. That is, the valve ST1 is disposed in the main passage MF (of the first passage according to the present invention), with its one port connected to the master cylinder MC and the other port connected to the valves PC1, PC2, like the second embodiment as shown in FIG. 2. In this embodiment, a passage MFc' (i.e., the second passage) is connected to the inlet of the pump HP1 through the check valve CV5, and connected to the valve ST2 which is connected to the master cylinder MC, and which is opened when the braking force is applied to the wheel irrespective of depression of the brake pedal (e.g., during the steering control by braking, or the traction control). In parallel with the valve ST1, the check valve CV11 for permitting the brake fluid to flow only from the master cylinder MC to the wheel cylinders, and the relief valve RVF are disposed. In the passages AMr, AMl, the valves SB1, SB2 and the check valves AV1, AV2 are disposed, respectively. The valve ST2 may be of a normally open type. Likewise, a passage MRc' (i.e., the second passage), the valves ST3, ST4, the check valve CV12 and the relief valve RVF are disposed in the rear hydraulic pressure circuit, as shown in FIG. 4.

Figure 13:
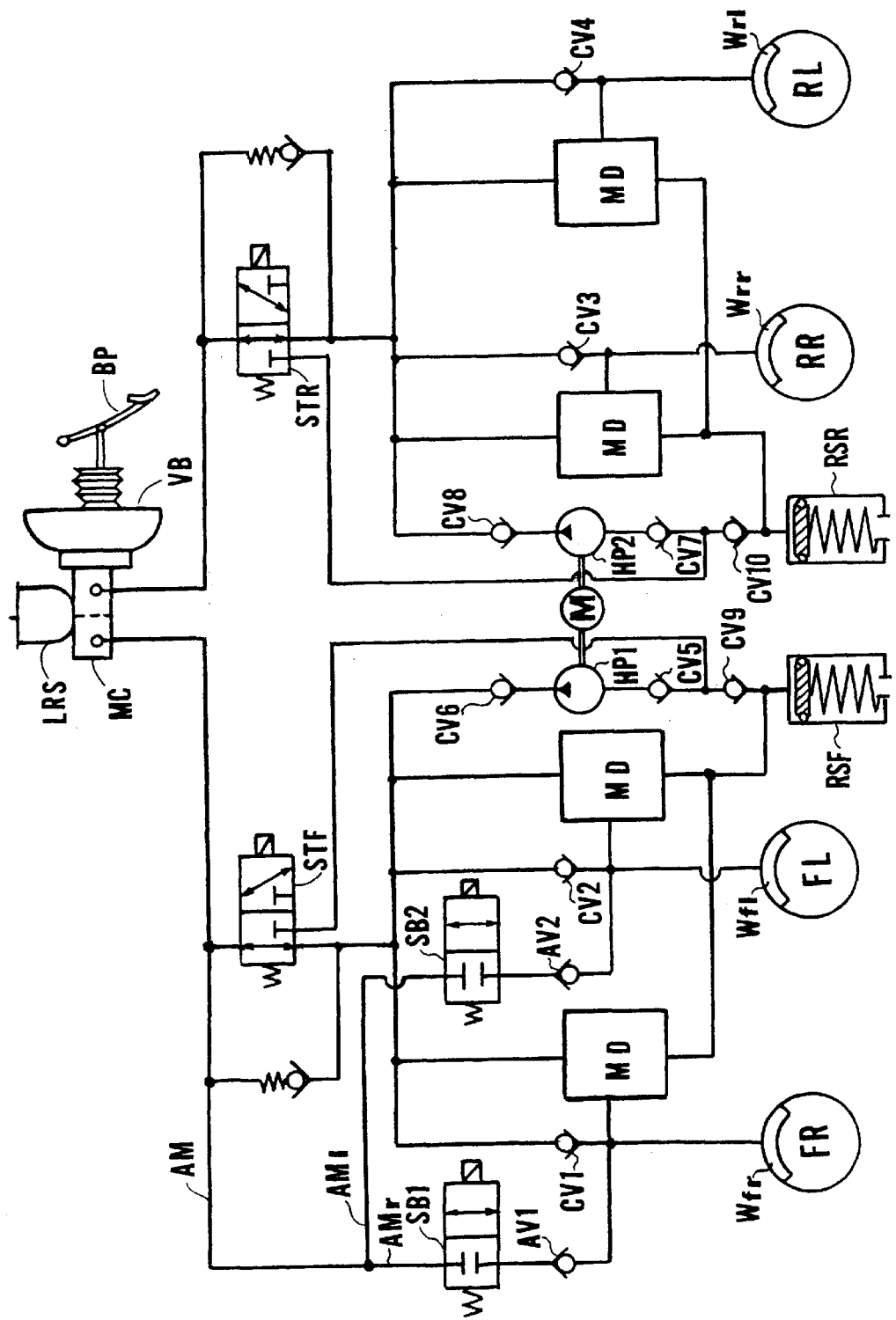
FIG. 13 is a block diagram illustrating a hydraulic braking system according to a fifth embodiment of the present invention.

FIG. 13 shows a fifth embodiment of the present invention, which is basically the same as the first embodiment, with a simple structure having the same structure as the first embodiment only with respect to the front wheels FR, FL. That is, only the wheel cylinders Wfr, Wfl in the front hydraulic pressure circuit are provided with the valves SB1, SB2 and check valves AV1, AV2 which are disposed in the passages AMr, AMl, respectively. In FIG. 13 (and FIGS. 14, 15, as well), normally open valve (e.g., PC1) and normally closed valve (e.g., PC5) are represented by a modulator (i.e., pressure control device) MD of a single block.

Figure 14:
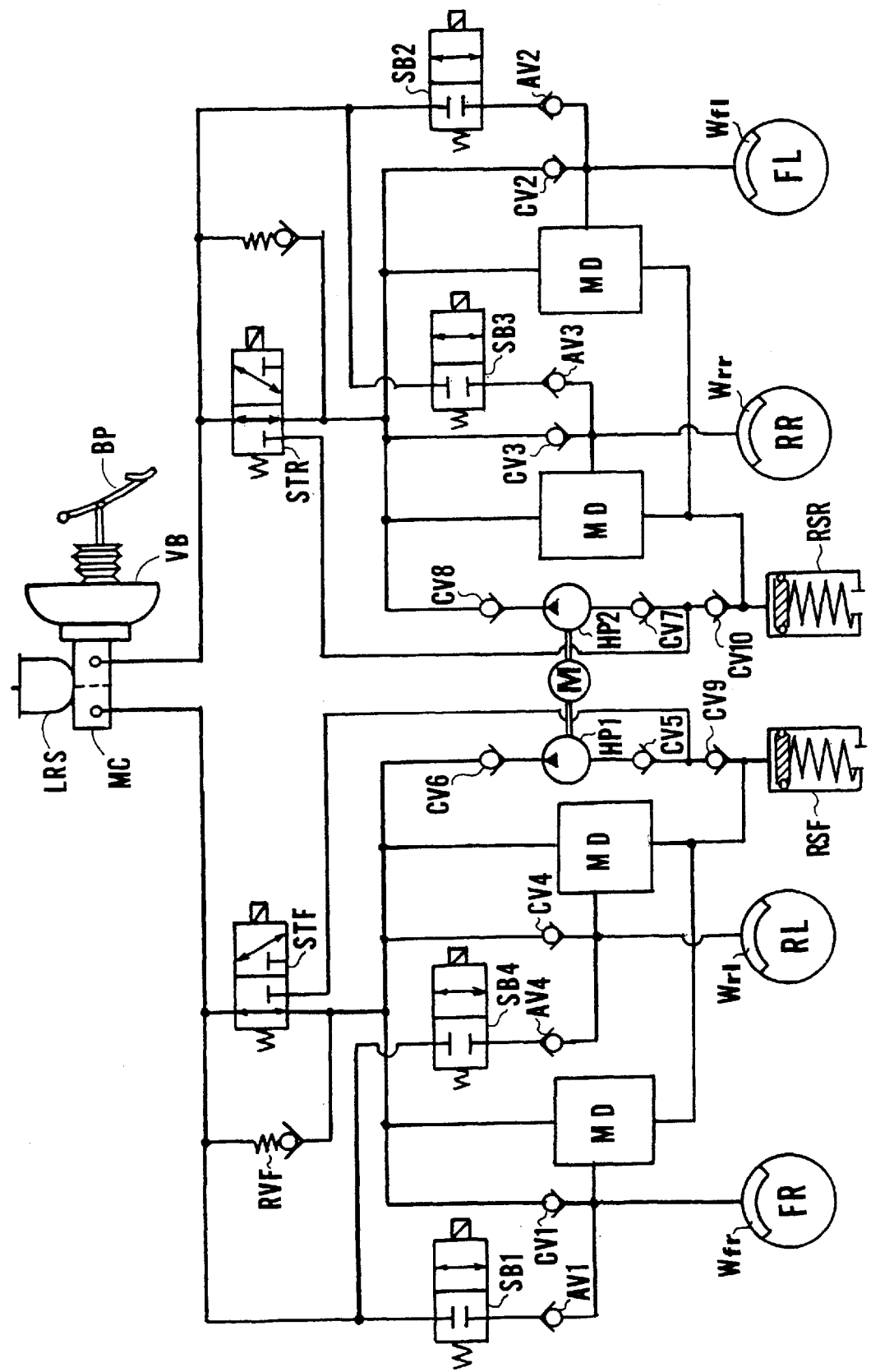
FIG. 14 is a block diagram illustrating a hydraulic braking system according to a sixth embodiment of the present invention.
Figure 15:
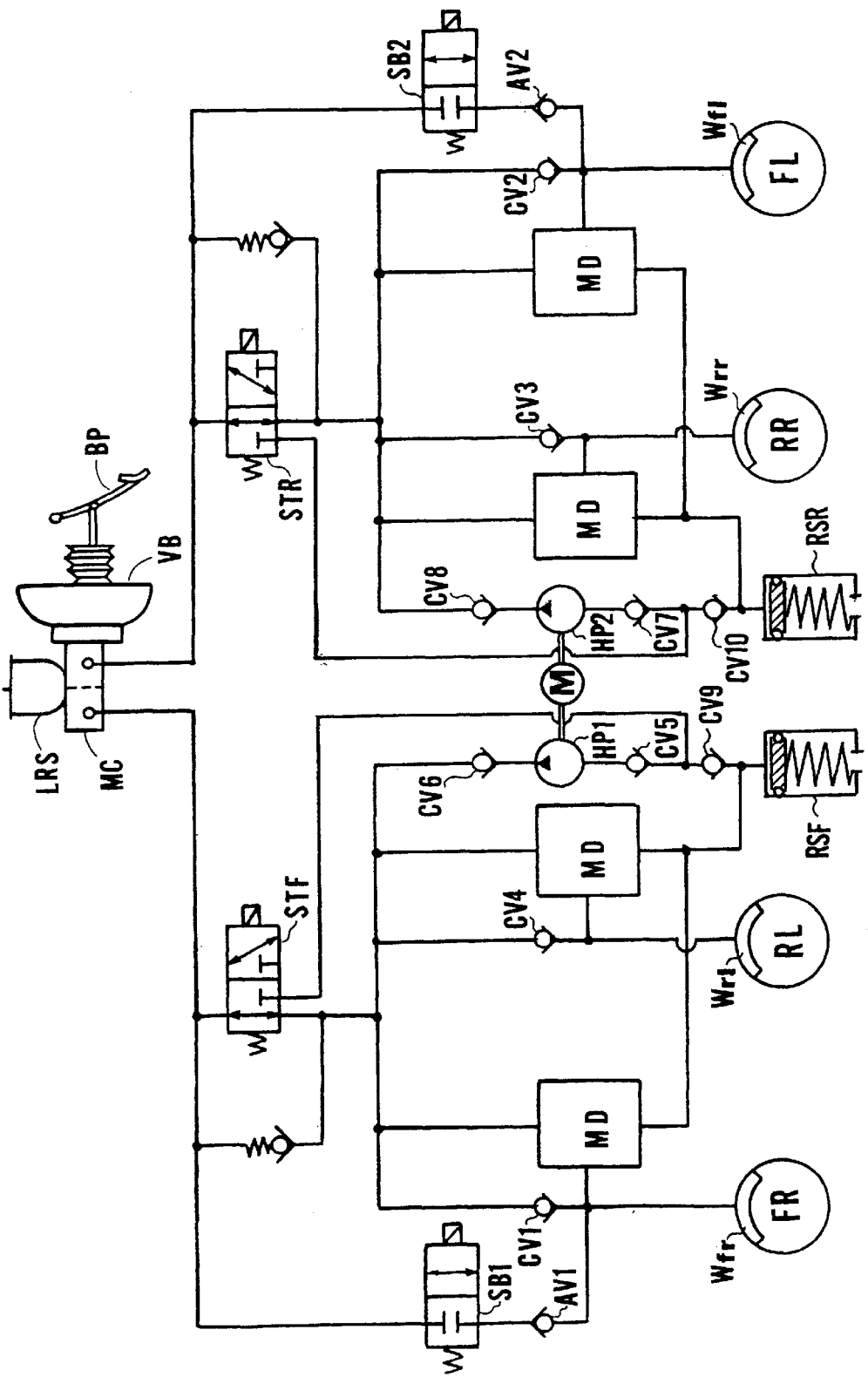
FIG. 15 is a block diagram illustrating a hydraulic braking system according to a seventh embodiment of the present invention.

The present invention may be applied to a front drive vehicle, as shown in FIGS. 14 and 15 for example, wherein the diagonal circuit system is employed, and may be applied to a four wheel drive vehicle. According to a sixth embodiment as shown in FIG. 14, the normally closed two-port two-position electromagnetic valves SB1 to SB4, and the check valves AV1 to AV4 are provided to enable the additional depression of the brake pedal BP. Whereas, according to a seventh embodiment as shown in FIG. 15, only the wheel cylinders Wfr, Wfl in the front hydraulic pressure circuit are provided with the valves SB1, SB2 and check valves AV1, AV2, so that the additional depression of the brake pedal BP can be made only with respect to the front wheels FR, FL.

Thus, the changeover valves STF, STR and the valves SB1 to SB4 according to the sixth embodiment are controlled as follows;

| wheel to be controlled | control mode | solenoid valves | |
|---|---|---|---|
| FR | normal braking | STF | off |
| | | SB1 | off |
| | anti-skid control | STF | off |
| | | SB1 | off |
| | steering control by braking | STF | on/off |
| | | SB1 | on* |
| | traction control | STF | on/off |
| | | SB1 | off |
| FL | normal braking | STR | off |
| | | SB2 | off |
| | anti-skid control | STR | off |
| | | SB2 | off |
| | steering control by braking | STR | on/off |
| | | SB2 | on* |
| | traction control | STR | on/off |
| | | SB2 | on |
| RR | normal braking | STR | off |
| | | SB3 | off |
| | anti-skid control | STR | off |
| | | SB3 | off |
| | steering control by braking | STR | on/off |
| | | SB3 | on* |
| | front-rear distribution control | STR | off |
| | | SB3 | off |
| RL | normal braking | STF | off |
| | | SB4 | off |
| | anti-skid control | STF | off |
| | | SB4 | off |
| | steering control by braking | STF | on/off |
| | | SB4 | on* |
| | front-rear distribution control | STF | off |
| | | SB4 | off |

In the above table, the mark "*" indicates that when the control mode is shifted into the anti-skid control during the steering control by braking operation, the valve will be de-energized.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A hydraulic braking system for an automotive vehicle having a pair of hydraulic pressure circuits for braking each wheel of said vehicle, a reservoir for storing brake fluid, and a master cylinder for pressurizing the brake fluid fed from said reservoir and supplying hydraulic pressure to said hydraulic pressure circuits in response to depression of a brake pedal, at least one of said hydraulic pressure circuits comprising:

a first wheel cylinder operatively mounted on a first wheel of said vehicle for braking said first wheel;

a second wheel cylinder operatively mounted on a second wheel of said vehicle for braking said second wheel;

a first passage for communicating said master cylinder with said first and second wheel cylinders;

first pressure control means disposed in said first passage for controlling the hydraulic pressure in said first wheel cylinder;

second pressure control means disposed in said first passage for controlling the hydraulic pressure in said second wheel cylinder;

an auxiliary pressure source having an inlet for introducing the brake fluid from said first and second wheel cylinders through said first and second pressure control means, respectively, and an outlet for discharging pressurized brake fluid to said first and second wheel cylinders through said first and second pressure control means, respectively;

a second passage for communicating said master cylinder with the inlet of said auxiliary pressure source;

valve means disposed in said first passage and connected to said second passage for being selectively positioned in one of a first operating position for communicating said master cylinder with said first and second pressure control means, and blocking communication between said master cylinder and the inlet of said auxiliary pressure source, and a second operating position for communicating said master cylinder with the inlet of said auxiliary pressure source and blocking communication between said master cylinder and said first and second pressure control means, wherein said valve means comprises a normally open two-port two-position valve disposed in said first passage and having one port connected to said master cylinder and the other port connected to said first and second pressure control means, and a normally closed two-port two position valve having one port connected to said master cylinder and the other port connected to said second passage;

at least one auxiliary passage for communicating said master cylinder with at least one of said first and second wheel cylinders to supply hydraulic pressure from the master cylinder to the at least one of said first and second wheel cylinders; and at least one switching valve disposed in said auxiliary passage for opening and closing said auxiliary passage.

2. The hydraulic braking system as claimed in claim 1, wherein both of said hydraulic pressure circuits include;

a first auxiliary passage for communicating said master cylinder with said first wheel cylinder;

a first switching valve disposed in said first auxiliary passage for opening and closing said first auxiliary passage;

a second auxiliary passage for communicating said master cylinder with said second wheel cylinder; and a second switching valve disposed in said second auxiliary passage for opening and closing said second auxiliary passage.

3. The hydraulic braking system as claimed in claim 1, wherein both of said hydraulic pressure circuits include;

an auxiliary passage for communicating said master cylinder with one of said first and second wheel cylinders; and a switching valve disposed in said auxiliary passage for opening and closing said auxiliary passage.

4. The hydraulic braking system as claimed in claim 1, wherein said auxiliary passage is connected to a position between said master cylinder and said valve means.

5. The hydraulic braking system as claimed in claim 1, wherein said auxiliary passage is connected to said second passage, to communicate said master cylinder with at least one of said first and second wheel cylinders through said valve means in the second operating position thereof.

6. The hydraulic braking system as claimed in claim 1, wherein said auxiliary pressure source comprises an electric motor and a fluid pump driven by said electric motor for introducing the brake fluid from said master cylinder into said fluid pump through the inlet thereof and discharging the pressurized brake fluid from the outlet of said fluid pump.

7. The hydraulic braking system as claimed in claim 7, further comprising an auxiliary reservoir connected to said first and second pressure control means and the inlet of said fluid pump for storing the brake fluid drained from said first and second pressure control means, the brake fluid stored in said auxiliary reservoir being drained by said fluid pump into said master cylinder.

8. The hydraulic braking system as claimed in claim 1, wherein said switching valve is a normally closed two-port two-position valve.

9. The hydraulic braking system as claimed in claim 1, further comprising a check valve disposed in said auxiliary passage between said switching valve and one of said first and second wheel cylinders, for allowing the flow of the brake fluid from said switching valve to one of said first and second wheel cylinders, and preventing the reverse flow.

10. A hydraulic braking system for an automotive vehicle having a pair of hydraulic pressure circuits for braking each wheel of said vehicle, a reservoir for storing brake fluid, and a master cylinder for pressurizing the brake fluid fed from said reservoir and supplying hydraulic pressure to said hydraulic pressure circuits in response to depression of a brake pedal, said hydraulic braking system being operational to effect at least one of traction control and steering control by braking, at least one of said hydraulic pressure circuits comprising:

a first wheel cylinder operatively mounted on a first wheel of said vehicle for braking said first wheel;

a second wheel cylinder operatively mounted on a second wheel of said vehicle for braking said second wheel;

a first passage for communicating said master cylinder with said first and second wheel cylinders;

first pressure control means disposed in said first passage for controlling the hydraulic pressure in said first wheel cylinder;

second pressure control means disposed in said first passage for controlling the hydraulic pressure in said second wheel cylinder;

an auxiliary pressure source having an inlet for introducing the brake fluid from said first and second wheel cylinders through said first and second pressure control means, respectively, and an outlet for discharging pressurized brake fluid to said first and second wheel cylinders through said first and second pressure control means, respectively;

a second passage for communicating said master cylinder with the inlet of said auxiliary pressure source;

valve means disposed in said first passage and connected to said second passage for being selectively positioned in one of a first operating position for communicating said master cylinder with said first and second pressure control means, and blocking communication between said master cylinder and the inlet of said auxiliary pressure source, and a second operating position for communicating said master cylinder with the inlet of said auxiliary pressure source and blocking communication between said master cylinder and said first and second pressure control means;

at least one auxiliary passage for communicating said master cylinder with at least one of said first and second wheel cylinders; and at least one switching valve disposed in said auxiliary passage for opening and closing said auxiliary passage, said switching valve being operated to change from a closing condition in which the auxiliary passage is closed to an open position in which the auxiliary passage is open when steering control by braking or traction control is active.

11. The hydraulic braking system as claimed in claim 10, wherein both of said hydraulic pressure circuits include;
- a first auxiliary passage for communicating said master cylinder with said first wheel cylinder;
- a first switching valve disposed in said first auxiliary passage for opening and closing said first auxiliary passage;
- a second auxiliary passage for communicating said master cylinder with said second wheel cylinder; and a second switching valve disposed in said second auxiliary passage for opening and closing said second auxiliary passage.

12. The hydraulic braking system as claimed in claim 10, wherein only one of said hydraulic pressure circuits includes;
- a first auxiliary passage for communicating said master cylinder with said first wheel cylinder;
- a first switching valve disposed in said first auxiliary passage for opening and closing said first auxiliary passage;
- a second auxiliary passage for communicating said master cylinder with said second wheel cylinder; and
- a second switching valve disposed in said second auxiliary passage for opening and closing said second auxiliary passage.

13. The hydraulic braking system as claimed in claim 10, wherein both of said hydraulic pressure circuits include;
- an auxiliary passage for communicating said master cylinder with one of said first and second wheel cylinder; and
- a switching valve disposed in said auxiliary passage for opening and closing said auxiliary passage.

14. A hydraulic braking system for an automotive vehicle having a pair of hydraulic pressure circuits for braking each wheel of said vehicle, a reservoir for storing brake fluid, and a master cylinder for pressurizing the brake fluid fed from said reservoir and supplying hydraulic pressure to said hydraulic pressure circuits in response to depression of a brake pedal, at least one of said hydraulic pressure circuits comprising:
- a first wheel cylinder operatively mounted on a first wheel of said vehicle for braking said first wheel;
- a second wheel cylinder operatively mounted on a second wheel of said vehicle for braking said second wheel;
- a first passage for communicating said master cylinder with said first and second wheel cylinders;
- first pressure control means disposed in said first passage for controlling the hydraulic pressure in said first wheel cylinder;
- second pressure control means disposed in said first passage for controlling the hydraulic pressure in said second wheel cylinder;
- an auxiliary pressure source having an inlet for introducing the brake fluid from said first and second wheel cylinders through said first and second pressure control means, respectively, and an outlet for discharging pressurized brake fluid to said first and second wheel cylinders through said first and second pressure control means, respectively;
- a second passage for communicating said master cylinder with the inlet of said auxiliary pressure source;
- valve means disposed in said first passage and connected to said second passage for being selectively positioned in one of a first operating position for communicating said master cylinder with said first and second pressure control means, and blocking communication between said master cylinder and the inlet of said auxiliary pressure source, and a second operating position for communicating said master cylinder with the inlet of said auxiliary pressure source and blocking communication between said master cylinder and said first and second pressure control means;
- at least one auxiliary passage for communicating said master cylinder with at least one of said first and second wheel cylinders;
- at least one normally closed switching valve disposed in said auxiliary passage for opening and closing said auxiliary passage; and
- a check valve disposed in said auxiliary passage for allowing the flow of the brake fluid toward said one of the first and second wheel cylinders while preventing reverse flow.

15. The hydraulic braking system as claimed in claim 14, wherein both of said hydraulic pressure circuits include;
- a first auxiliary passage for communicating said master cylinder with said first wheel cylinder;
- a first switching valve disposed in said first auxiliary passage for opening and closing said first auxiliary passage;
- a second auxiliary passage for communicating said master cylinder with said second wheel cylinder; and a second switching valve disposed in said second auxiliary passage for opening and closing said second auxiliary passage.

16. The hydraulic braking system as claimed in claim 14, wherein only one of said hydraulic pressure circuits includes;
- a first auxiliary passage for communicating said master cylinder with said first wheel cylinder;
- a first switching valve disposed in said first auxiliary passage for opening and closing said first auxiliary passage;
- a second auxiliary passage for communicating said master cylinder with said second wheel cylinder; and
- a second switching valve disposed in said second auxiliary passage for opening and closing said second auxiliary passage.

* * * * *